United States Patent
Kim et al.

(10) Patent No.: US 10,871,852 B2
(45) Date of Patent: Dec. 22, 2020

(54) TOUCH DISPLAY DEVICE, TOUCH CIRCUIT, AND TOUCH SENSING METHOD

(71) Applicant: LG Display Co., Ltd., Seoul (KR)

(72) Inventors: HoonBae Kim, Seoul (KR); CheolSe Kim, Daegu (KR); SunYeop Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/123,873

(22) Filed: Sep. 6, 2018

(65) Prior Publication Data

US 2019/0079631 A1    Mar. 14, 2019

(30) Foreign Application Priority Data

Sep. 8, 2017  (KR) .................. 10-2017-0115373
Dec. 11, 2017  (KR) .................. 10-2017-0169776

(51) Int. Cl.
| | |
|---|---|
| *G06F 3/041* | (2006.01) |
| *G06F 3/044* | (2006.01) |
| *G09G 3/36* | (2006.01) |
| *G09G 3/3275* | (2016.01) |
| *G09G 3/3266* | (2016.01) |

(52) U.S. Cl.
CPC ............ *G06F 3/0416* (2013.01); *G06F 3/044* (2013.01); *G06F 3/0412* (2013.01); *G06F 3/0418* (2013.01); *G06F 3/0443* (2019.05); *G06F 3/04166* (2019.05); *G06F 2203/04112* (2013.01); *G09G 3/3266* (2013.01); *G09G 3/3275* (2013.01); *G09G 3/3674* (2013.01); *G09G 3/3685* (2013.01); *G09G 2310/08* (2013.01)

(58) Field of Classification Search
CPC .............................. G06F 3/0418; G06F 3/044
See application file for complete search history.

(56) References Cited

U.S. PATENT DOCUMENTS

| | | | |
|---|---|---|---|
| 2011/0096023 A1* | 4/2011 | Shih ............. | G06F 3/0412 345/174 |
| 2013/0300690 A1 | 11/2013 | Yang et al. | |
| 2015/0138145 A1 | 5/2015 | Hwang et al. | |
| 2016/0231853 A1* | 8/2016 | Weng .............. | G06F 3/044 |
| 2017/0090624 A1* | 3/2017 | Kwon ............. | G06F 3/0416 |
| 2018/0136778 A1 | 5/2018 | Choi et al. | |
| 2018/0188865 A1* | 7/2018 | Jang .............. | G06F 3/0418 |

FOREIGN PATENT DOCUMENTS

WO    WO 2016/195388 A1    12/2016

OTHER PUBLICATIONS

Combined Search and Examination Report, UK Patent Application No. GB1814626.6, dated Feb. 28, 2019, 6 pages.

* cited by examiner

*Primary Examiner* — Shaheda A Abdin
(74) *Attorney, Agent, or Firm* — Fenwick & West LLP

(57) ABSTRACT

Embodiments of the present disclosure relate to a touch display device, a touch circuit, and a touch sensing method. More particularly, by performing differential sensing on touch electrodes, noise components which the touch electrodes receive from display electrodes (e.g., data line, gate line, etc.) may be removed to accurately sense a touch, so that display driving and touch sensing may be normally performed simultaneously. In this manner, the display driving and the touch sensing may be normally performed simultaneously, thereby enabling implementation of a high-resolution display.

25 Claims, 19 Drawing Sheets

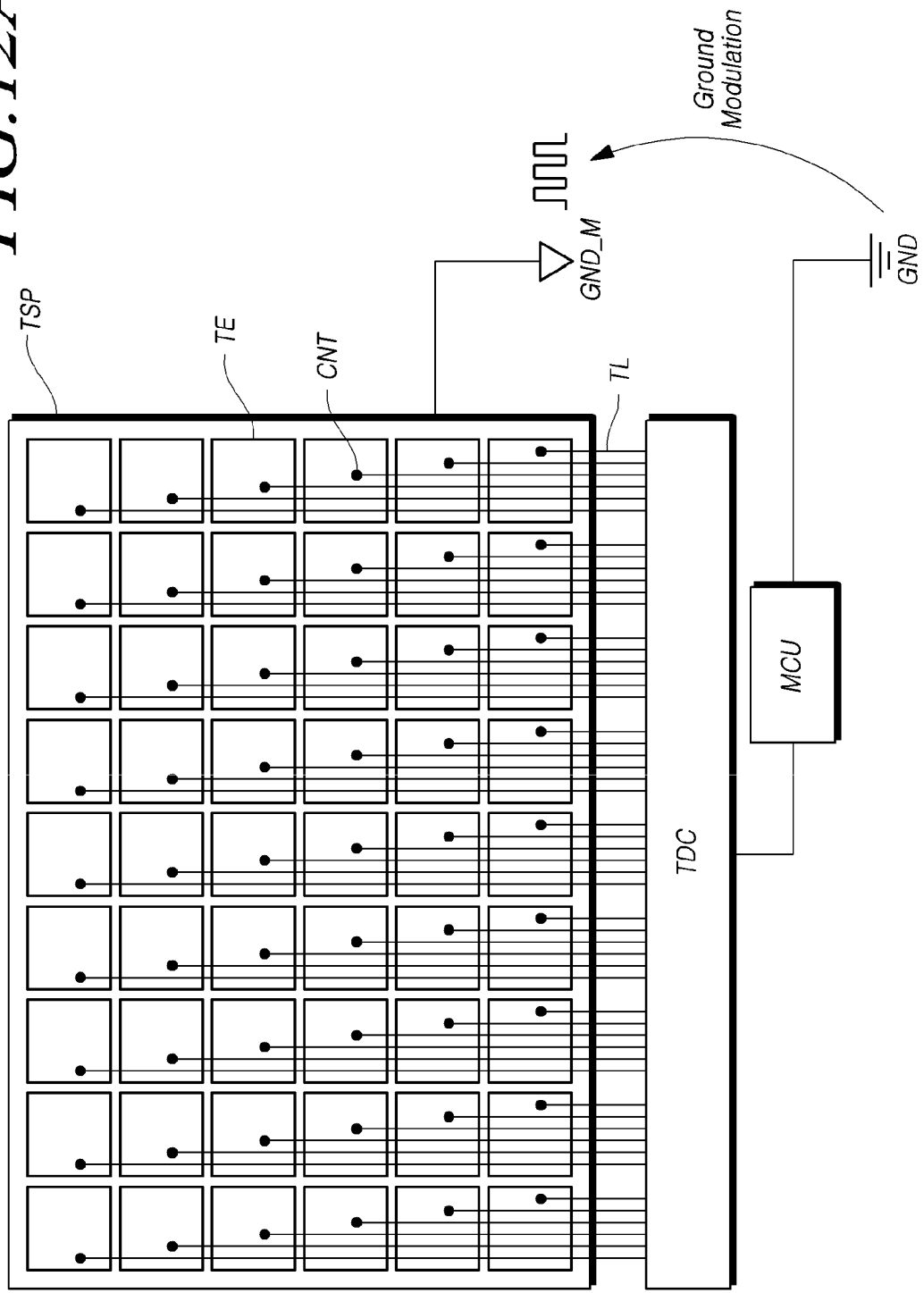

TOUCH DISPLAY DEVICE, TOUCH CIRCUIT, AND TOUCH SENSING METHOD

CROSS REFERENCE TO RELATED APPLICATION

This application claims priority from Republic of Korea Patent Application No. 10-2017-0115373 filed on Sep. 8, 2017 and Republic of Korea Patent Application No. 10-2017-0169776 filed on Dec. 11, 2017, which are each incorporated by reference in its entirety.

BACKGROUND

1. Field of Technology

The present disclosure relates to a touch display device, a touch circuit, and a touch sensing method.

2. Description of the Prior Art

With the development of an information society, demands for a touch display device for displaying an image have increased in various forms. Recently, various display devices such as a liquid crystal display device, a plasma display device, an organic light emitting display device, etc., have been utilized.

Among such display devices, there is a touch display device that provides a touch-based input method that allows a user to easily input information or commands intuitively and conveniently, away from a conventional input method such as buttons, a keyboard, or a mouse.

Since such a touch display device must provide both an image display function and a touch sensing function, a driving time such as a frame time may be divided into a display driving period and a touch driving period, display driving may be performed in the display driving period, and touch driving and touch sensing may be performed in the touch driving period after the display driving period.

In the case of the above-described time division driving method, in order to perform the display driving and the touch driving in time division, a considerably precise timing control is required and an expensive part for the considerably precise timing control may be required.

In addition, in the case of the time division driving method, both the display driving time and the touch driving time may be insufficient, so that both the image quality and the touch sensitivity may be lowered. In particular, there has been a problem in that high-resolution image quality cannot be provided due to the time division driving.

SUMMARY

In this background, an aspect of embodiments of the present disclosure is to provide a touch display device, a touch circuit, and a touch sensing method which may simultaneously perform display driving and touch driving.

Another aspect of embodiments of the present disclosure is to provide a touch display device, a touch circuit, and a touch sensing method which may prevent touch sensitivity from being affected by display driving.

Another aspect of embodiments of the present disclosure is to provide a touch display device, a touch circuit, and a touch sensing method which may enable high resolution display implementation.

Another aspect of embodiments of the present disclosure is to provide a touch display device, a touch circuit, and a touch sensing method which may perform touch sensing without being influenced by data driving.

Another aspect of embodiments of the present disclosure is to provide a touch display device, a touch circuit, and a touch sensing method which may sense a touch while ensuring a maximum display driving time and a sufficient pixel charging time.

Embodiments of the present disclosure may provide a touch display device comprising: a display panel comprising a plurality of data lines, a plurality of gate lines, a plurality of touch electrodes, and a plurality of touch lines that are electrically connected to the plurality of touch electrodes; and a touch circuit configured to supply a touch driving signal to the plurality of touch electrodes via the plurality of touch lines during a display driving period of the touch display device where an image is displayed on the display panel, and detect a presence or an absence of a touch of the touch display device based on a difference between sensing signals received from two or more of the plurality of touch electrodes responsive to the touch driving signal.

Embodiments of the present disclosure may provide a touch circuit that senses touch on a display panel that comprises a plurality of data lines, a plurality of gate lines, a plurality of touch electrodes, and a plurality of touch lines that are electrically connected to the plurality of touch electrodes, the touch circuit configured to supply a touch driving signal to the plurality of touch electrodes via the plurality of touch lines during a display driving period of the touch display device where an image is displayed on the display panel, the touch circuit comprising: a differential amplifier configured to output an output signal indicative of a presence or absence of touch of the display panel based on a difference between a first sensing signal received from a first touch electrode of the plurality of touch electrodes through a first touch line from the plurality of touch lines and a second sensing signal received from a second touch electrode of the plurality of touch electrodes through a second touch line of the plurality of touch lines.

Embodiments of the present disclosure may provide a touch sensing method of a touch display device comprising a display panel including a plurality of data lines, a plurality of gate lines, a plurality of touch electrodes, and a plurality of touch lines electrically connected to the plurality of touch electrodes, the touch sensing method comprising: supplying a touch driving signal to the plurality of touch electrodes via the plurality of touch lines during a display driving period of the touch display device where an image is displayed on the display panel; receiving a first sensing signal from a first touch electrode of the plurality of touch electrodes through a first touch line of the plurality of touch lines; receiving a second sensing signal from a second touch electrode of the plurality of touch electrodes through a second touch line of the plurality of touch lines; generating an output signal based on a difference between the first sensing signal and the second sensing signal; and detecting a presence or an absence of touch of the touch display device based on the output signal.

According to the above-described embodiments of the present disclosure, it is possible to provide a touch display device, a touch circuit, and a touch sensing method which may simultaneously perform display driving and touch driving.

In addition, according to the embodiments of the present disclosure, it is possible to provide a touch display device, a touch circuit, and a touch sensing method which may prevent touch sensitivity from being affected by display driving.

In addition, according to the embodiments of the present disclosure, it is possible to provide a touch display device, a touch circuit, and a touch sensing method which may enable high resolution display implementation.

In addition, according to the embodiments of the present disclosure, it is possible to provide a touch display device, a touch circuit, and a touch sensing method which may perform touch sensing without being influenced by data driving.

In addition, according to the embodiments of the present disclosure, it is possible to provide a touch display device, a touch circuit, and a touch sensing method which may sense a touch while ensuring a maximum display driving time and a sufficient pixel charging time.

BRIEF DESCRIPTION OF THE DRAWINGS

The above and other aspects, features and advantages of the present disclosure will be more apparent from the following detailed description taken in conjunction with the accompanying drawings, in which:

FIGS. 12A and 12B are diagrams illustrating ground voltage modulation for time-free driving in a touch display device according to embodiments of the present disclosure;

DETAILED DESCRIPTION

Figure 1:
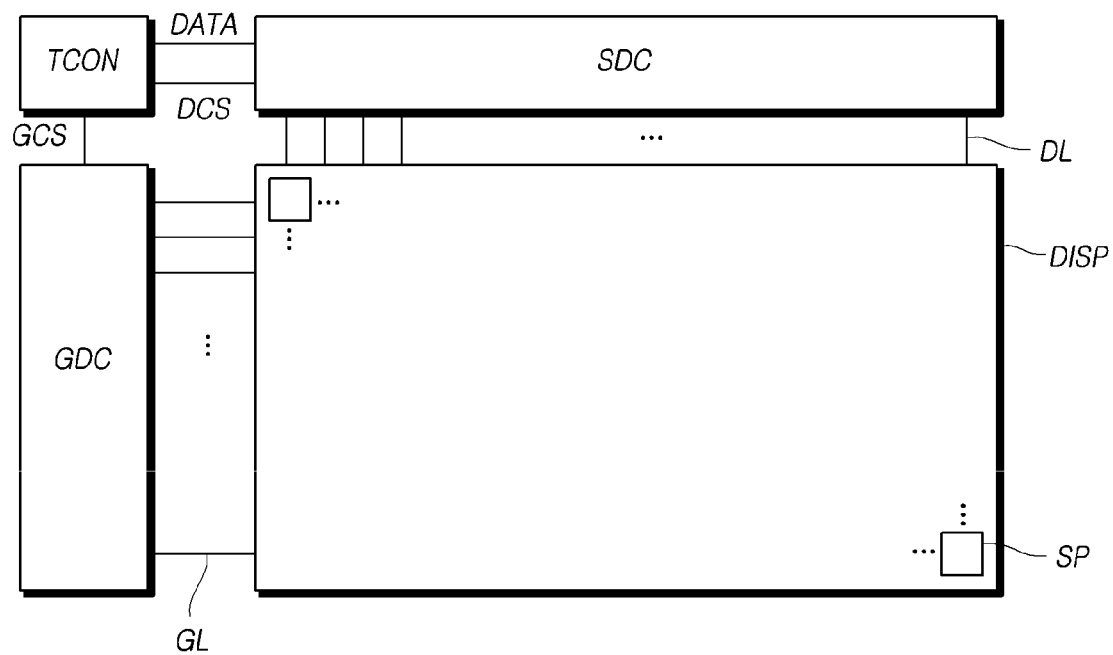
FIGS. 1 and 2 are system configuration diagrams illustrating a touch display device according to embodiments of the present disclosure.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 2:
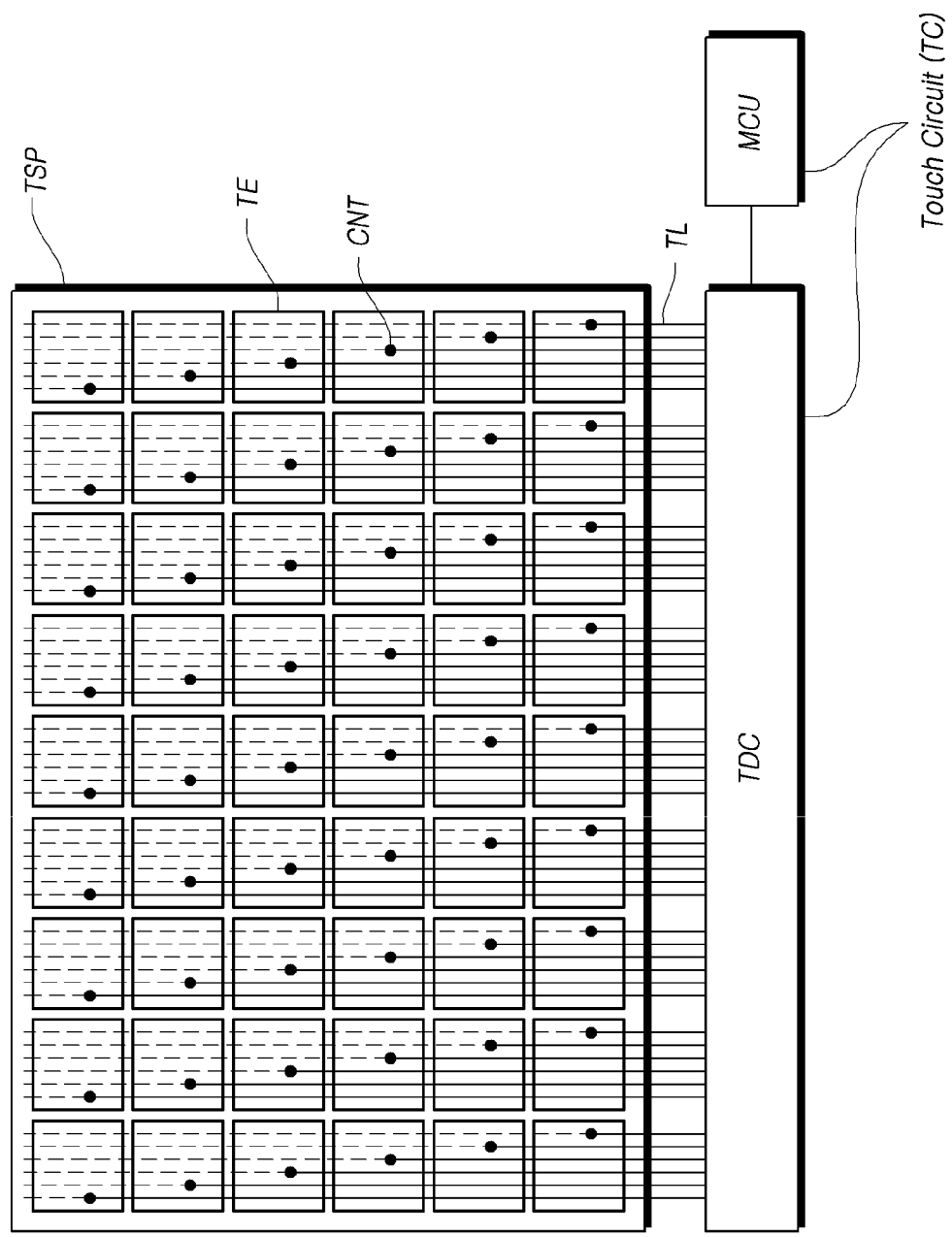

FIGS. 1 and 2 are system configuration diagrams illustrating a touch display device according to embodiments of the present disclosure.

The touch display device according to embodiments may perform an image display function and a touch sensing function (touch input function).

Hereinafter, configurations for providing an image display function of a touch display device according to embodiments will be described with reference to FIG. 1, and configurations for providing a touch sensing function (touch input function) of a touch display device according to embodiments will be described with reference to FIG. 2.

Referring to FIG. 1, in order to provide an image display function, a touch display device according to embodiments includes a display panel DISP in which a plurality of data lines DL and a plurality of gate lines GL are disposed and a plurality of subpixels SP defined by the plurality of data lines DL and the plurality of gate lines GL are arranged, a source driving circuit SDC for driving the plurality of data lines DL, a gate driving circuit GDC for driving the plurality of gate lines GL, and a timing controller TCON for controlling the source driving circuit SDC and the gate driving circuit GDC.

In the display panel DISP, a pixel electrode in each subpixel SP may be disposed.

A pixel voltage may be applied to the pixel electrode of each subpixel SP.

In addition, in the display panel DISP, one or two or more common electrodes to which a common voltage is applied may be disposed.

One common electrode is one tubular electrode formed on the front surface of the display panel DISP.

Two or more common electrodes may be regarded as electrodes in which one tubular electrode is divided into two or more. Each of the two or more common electrodes may have a size larger than that of one subpixel region.

In each subpixel SP, a corresponding electric field may be formed by a pixel voltage (which may be a data voltage) applied to a corresponding pixel electrode and a common voltage applied to the common electrode.

The timing controller TCON supplies various driving control signals DCS and GCS to the source driving circuit SDC and the gate driving circuit GDC to control the source driving circuit SDC and the gate driving circuit GDC.

Such a timing controller TCON starts scanning according to the timing implemented in each frame, switches input image data inputted from the outside in accordance with a data signal format used in the source driving circuit SDC, outputs the switched image data, and controls data driving at a suitable time according to the scanning.

The above-mentioned timing controller TCON receives various timing signals including a vertical synchronization signal Vsync, a horizontal synchronization signal Hsync, an input data enable (DE) signal, a clock signal CLK, etc., in addition to the input image data from the outside (e.g., host system).

In addition to switching the input image data inputted from the outside in accordance with the data signal format used in the source driving circuit SDC and outputting the switched image data, the timing controller TCON receives the timing signals such as the vertical synchronization signal Vsync, the horizontal synchronization signal Hsync, the input DE signal, the clock signal CLK, etc., generates various driving control signals, and outputs the generated various driving control signals to the source driving circuit SDC and the gate driving circuit GDC, in order to control the source driving circuit SDC and the gate driving circuit GDC.

For example, the timing controller TCON may output various gate driving control signals GCS including a gate start pulse GSP, a gate shift clock GSC, a gate output enable signal GOE, etc., to control the gate driving circuit GDC.

In addition, the timing controller TCON may output various data driving control signals DCS including a source start pulse SSP, a source sampling clock SSC, a source output enable signal SOE, etc., to control the source driving circuit SDC.

Such a timing controller TCON may be a control device that includes a timing controller to perform other control functions.

The timing controller TCON may be implemented as a separate component from the source driving circuit SDC or may be integrated with the source driving circuit SDC and implemented as an integrated circuit.

The source driving circuit SDC receives image data from the timing controller TCON and supplies the data voltage to the plurality of data lines DL to drive the plurality of data lines DL. Here, the source driving circuit SDC is also referred to as a data driving circuit.

Such a source driving circuit SDC may be implemented by including at least one source driver integrated circuit SDIC.

Each source driver integrated circuit SDIC may include a shift register, a latch circuit, a digital to analog converter DAC, an output buffer, and the like.

In some cases, each source driver integrated circuit SDIC may further include an analog to digital converter ADC.

Each source driver integrated circuit SDIC may be connected to a bonding pad of the display panel DISP in a tape automated bonding (TAB) method or a chip on glass (COG) method, or may be directly disposed on the display panel DISP. In some cases, each source driver integrated circuit SDIC may be integrated and disposed on the display panel DISP. Further, each source driver integrated circuit SDIC may be implemented in a chip on film (COF) method in which it is mounted on a film connected to the display panel DISP.

The gate driving circuit GDC sequentially supplies scanning signals to the plurality of gate lines GL to sequentially drive the plurality of gate lines GL. Here, the gate driving circuit GDC is also referred to as a scan drive circuit.

Such a gate driving circuit GDC may be implemented by including at least one gate driver integrated circuit GDIC.

Each gate driver integrated circuit GDIC may include a shift register, a level shifter, and the like.

Each gate driver integrated circuit GDIC may be connected to a bonding pad of the display panel DISP in a tape automated bonding (TAB) method or a chip on glass (COG) method, or may be implemented as a gate in panel (GIP) type and directly disposed on the display panel DISP. In some cases, each gate driver integrated circuit GDIC may be integrated and disposed on the display panel DISP. Further, each gate driver integrated circuit GDIC may be implemented in a COF method in which it is mounted on a film connected to the display panel DISP.

The gate driving circuit GDC sequentially supplies a scanning signal of an On voltage or an Off voltage to the plurality of gate lines GL under the control of the timing controller TCON.

When a specific gate line is opened by the gate driving circuit GDC, the source driving circuit SDC converts image data DATA received from the timing controller TCON into an analog data voltage and may supply the converted result to the plurality of data lines DL.

The source driving circuit SDC may be located only on one side (e.g., either the upper side or the lower side) of the display panel DISP. In some cases, the source driving circuit SDC may be located on both sides (e.g., the upper side and the lower side) of the display panel DISP depending on a driving method, a panel design method, or the like.

The gate driving circuit GDC may be located only on one side (e.g., either the left side or the right side) of the display panel DISP. In some cases, the gate driving circuit GDC may be located on both sides (e.g., the left side and the right side) of the display panel DISP depending on a driving method, a panel design method, or the like.

Referring to FIG. 2, the touch display device according to embodiments may include a touch screen panel TSP and a touch circuit TC for sensing a touch using the touch screen panel TSP, in order to provide a touch sensing function.

The touch circuit TC may include a touch driving circuit TDC, a micro-control unit MCU, etc.

The touch driving circuit TDC and the micro control unit MCU may be separately implemented, or may be integrated into one for implementation.

On the touch screen panel TSP, a plurality of touch electrodes TE, and a plurality of touch lines TL electrically connected to the plurality of touch electrodes TE while corresponding thereto may be disposed.

One touch electrode TE may be a tubular electrode, an electrode having a plurality of holes, a mesh-shaped electrode, or a comb-like electrode.

One touch electrode TE may be electrically connected to one or two or more touch lines TL through one or more contact holes or the like.

The plurality of touch lines TL electrically connect the plurality of touch electrodes TE to the touch driving circuit TDC.

The touch driving circuit TDC may drive the touch screen panel TSP to generate and output sensing data (touch raw data).

For example, the touch driving circuit TDC may supply a touch driving signal to all or some of the plurality of touch electrodes TE disposed on the touch screen panel TSP, and may detect a signal from at least one touch electrode TE to generate and output sensing data.

The touch driving circuit TDC may supply a touch driving signal to one or more touch electrodes TE through one or more touch lines TL and may detect a touch sensing signal.

The micro-control unit MCU may acquire the presence/absence of a touch and/or touch coordinates using the sensing data output from the touch driving circuit TDC.

The touch display device may be a mutual-capacitance-based touch sensing device or a self-capacitance-based touch sensing device.

When a touch is sensed based on the mutual-capacitance, the touch electrodes TE on the touch screen panel TSP may be arranged in a matrix form. In this case, each of the touch electrodes TE may be provided in the form of a bar.

Alternatively, when a touch is sensed based on the mutual-capacitance, the touch electrodes TE on the panel TSP may form touch electrode lines in a row direction and touch electrode lines in a column direction. In this case, the touch electrodes TE may be provided in the form of a diamond.

The touch driving circuit TDC supplies a touch driving signal to the touch electrodes TE or the touch electrode lines in the row direction (or column direction), receives a touch sensing signal from the touch electrodes TE or the touch electrode lines in the column direction (or row direction), and generates sensing data based on the received touch sensing signal to supply the generated sensing data to the micro-control unit MCU. The micro-control unit MCU senses the presence/absence of a touch or touch coordinates based on the sensing data.

When a touch is sensed based on the self-capacitance, the touch electrodes TE on the touch screen panel TSP may be electrodes electrically separated from each other.

Each touch driving circuit TDC supplies a touch driving signal to all or some of the plurality of touch electrodes TE, receives a touch sensing signal from the touch electrodes TE to which the touch driving signal is supplied, and generates sensing data based on the received touch sensing signal to supply the generated sensing data to the micro-control unit MCU. The micro-control unit MCU senses the presence/absence of a touch or touch coordinates based on the sensing data.

As described above, the touch display device according to embodiments of the present disclosure may detect a touch based on the self-capacitance or the mutual-capacitance. However, for convenience of description, the detection of the touch based on the self-capacitance will be described as an example.

The touch screen panel TSP may be manufactured separately from the display panel DISP and bonded to the display panel DISP or embedded in the display panel DISP.

When the touch screen panel TSP is embedded in the display panel DISP, the touch screen panel TSP may be regarded as a collection of the plurality of touch electrodes TE and the plurality of touch lines TL.

The touch driving circuit TDC and the source driving circuit SDC may be integrally implemented.

Figure 3:
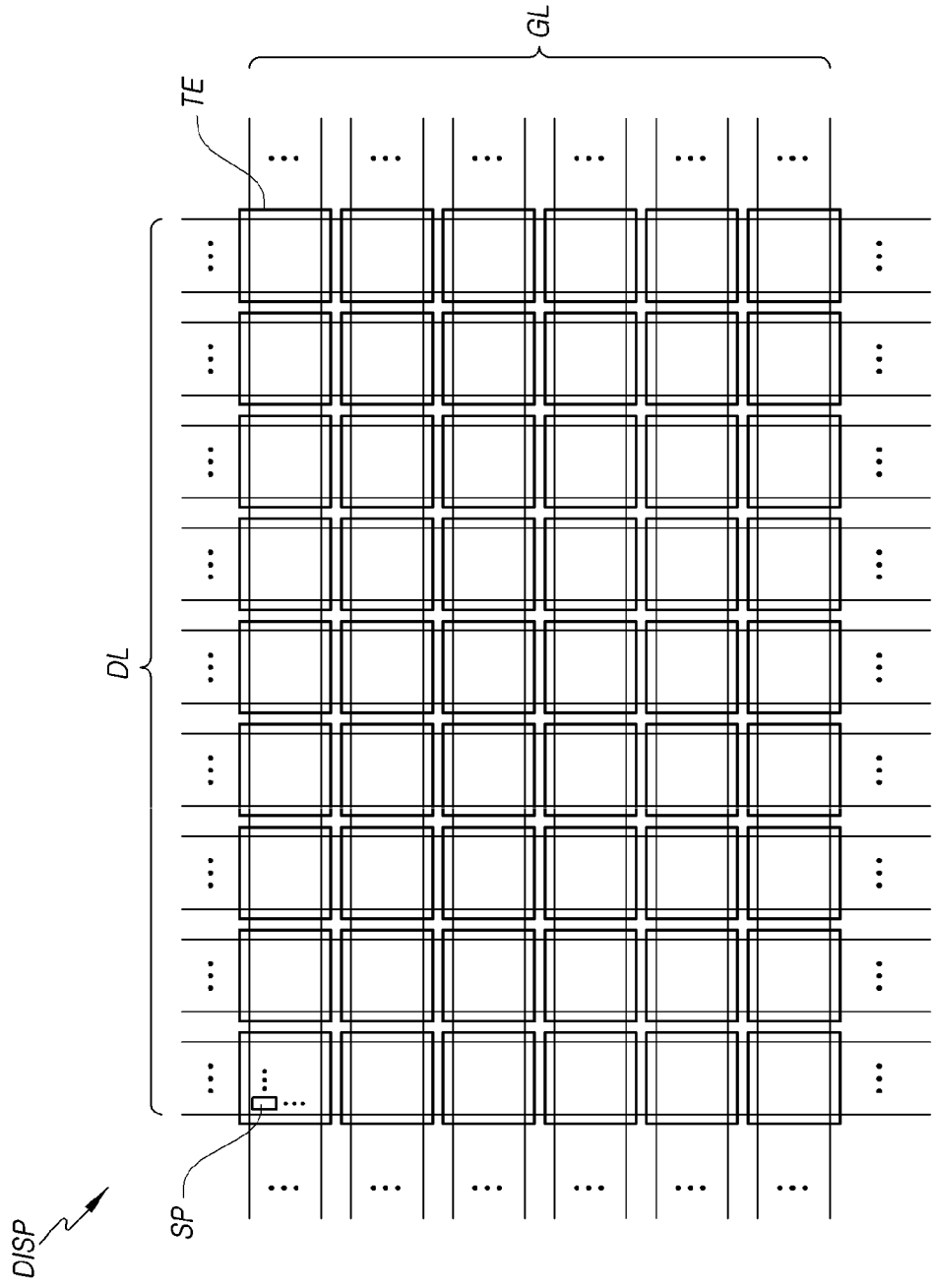
FIG. 3 is a diagram illustrating a display panel in which a touch screen panel is embedded, in a touch display device according to embodiments of the present disclosure.

FIG. 3 is a diagram illustrating a display panel DISP with a touch screen panel TSP embedded therein, in a touch display device according to embodiments of the present disclosure.

When the touch screen panel TSP is embedded in the display panel DISP, a plurality of touch electrodes TE disposed on the display panel DISP may be common electrodes utilized when the display is driven. In this case, for example, the display panel DISP may be a liquid crystal display panel.

Accordingly, a common voltage may be applied to the plurality of touch electrodes TE for image display, and a touch driving signal may be applied to all or some of the plurality of touch electrodes TE for touch sensing.

Meanwhile, the display panel DISP may be an organic light emitting display panel. In this case, the plurality of touch electrodes TE and a plurality of touch lines TL may be located on an encapsulation layer disposed on the common electrode, which is disposed on the front surface of the display panel DISP and to which a common voltage is applied.

Here, the common electrode disposed on the front surface of the display panel DISP, which is an organic light emitting display panel, may be a cathode electrode among an anode electrode (corresponding to a pixel electrode) and a cathode electrode of an organic light emitting diode (OLED) in each subpixel SP, and the common voltage may be a cathode voltage.

In this case, each of the plurality of touch electrodes TE may be provided in the form of a tubular electrode in which there is no open region. At this time, each of the plurality of touch electrodes TE may be a transparent electrode for light emission in the subpixels SP.

Alternatively, each of the plurality of touch electrodes TE may be a mesh-type electrode having a plurality of open regions. At this time, in each of the plurality of touch electrodes TE, each open region may correspond to a light emitting region (for example, a region where a part of the anode electrode is located) of the subpixel SP.

Meanwhile, in regard to the size of the touch electrode, a region of each of the plurality of touch electrodes TE may overlap the region of two or more subpixels SP.

That is, the region size of one touch electrode TE may correspond to the region size of two or more subpixels SP.

One touch electrode TE may overlap two or more gate lines GL.

One touch electrode TE and two or more gate lines GL are insulated from each other.

One touch electrode TE may overlap two or more data lines DL.

One touch electrode TE and two or more data lines DL are insulated from each other.

Referring to FIGS. 2 and 3, the plurality of touch lines TL are insulated from each other within the touch screen panel TSP.

Referring to FIGS. 2 and 3, the plurality of touch lines TL may be arranged in the same direction as the plurality of data lines DL.

In this case, the data lines DL parallel to the touch lines TL affect the touch electrodes TE arranged in the same direction. That is, the voltage state of the data lines DL parallel to the touch lines TL affects the voltage state of the touch electrodes TE arranged in the same direction.

Alternatively, the plurality of touch lines TL may be arranged in the same direction as the plurality of gate lines GL.

In this case, the gate lines GL parallel to the touch lines TL affect the touch electrodes TE arranged in the same direction. That is, the voltage state of the gate lines GL parallel to the touch lines TL affects the voltage state of the touch electrodes TE arranged in the same direction.

Figure 4:
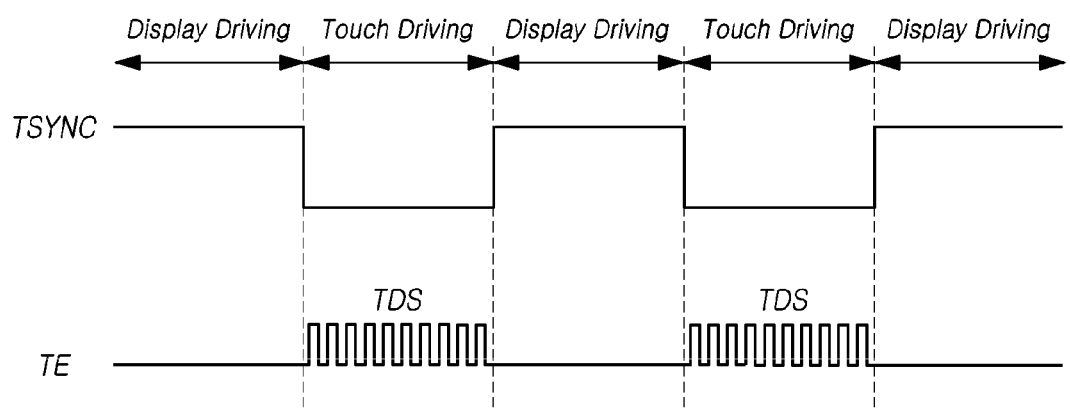
FIG. 4 is a diagram illustrating time-division driving of a touch display device according to embodiments of the present disclosure.
Figure 5:
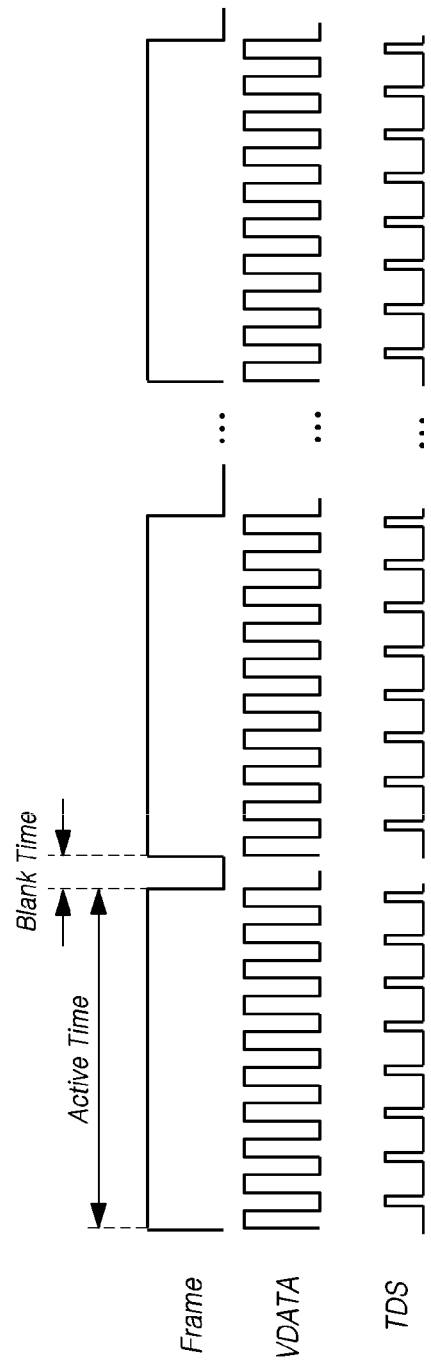
FIG. 5 is a diagram illustrating time-free driving of a touch display device according to embodiments of the present disclosure.

FIG. 4 is a diagram illustrating time-division driving of a touch display device according to embodiments of the present disclosure, and FIG. 5 is a diagram illustrating time-free driving of a touch display device according to embodiments of the present disclosure.

Hereinafter, it is assumed that a plurality of touch electrodes TE serve as a common electrode for display driving.

The touch display device according to embodiments of the present disclosure may perform a driving operation in a time-division driving method and/or a time-free driving method.

Referring to FIG. 4, when performing a driving operation in the time-division driving method, the touch display device according to embodiments of the present disclosure may perform display driving for providing an image display function and touch driving for providing a touch sensing function in each of a display driving period and a touch driving period on which time-division has been performed.

The display driving period and the touch driving period may be controlled in timing by a touch synchronization signal TSYNC.

During the display driving period, a common voltage which is a DC voltage may be applied to the plurality of touch electrodes TE.

Here, the common voltage may be a voltage that forms an electric field with the pixel voltage applied to the pixel electrode in each subpixel.

During the touch driving period, a touch driving signal TDS may be applied to all or some of the plurality of touch electrodes TE.

At this time, the touch driving signal TDS or a corresponding signal may be applied to all or a part of the data lines DL. The touch driving signal TDS or a signal corresponding to the touch driving signal may be further applied to all or some of the gate lines GL.

The touch driving signal TDS may be a signal whose voltage level is variable.

The touch driving signal TDS may be referred to as an AC signal, a modulation signal, or a pulse signal.

Referring to FIG. 5, when performing the driving operation in the time-free driving method, the touch display device according to embodiments of the present disclosure may simultaneously perform display driving for providing the image display function and touch driving for providing the touch sensing function. The time-free driving method is also referred to as a simultaneous driving method.

One frame time may correspond to one or more active times and one or more blank times.

When performing the driving operation in the time-free driving method, the touch display device according to embodiments may supply a data voltage VDATA to the data line DL during the active time at every frame time, and at this time, may supply the touch driving signal TDS to the plurality of touch electrodes TE.

The touch driving signal TDS may be a signal for driving the touch electrodes TE for touch sensing and may be a common voltage for allowing the touch electrodes TE to serve as a common electrode for display driving.

When the touch display device according to embodiments of the present disclosure performs the driving operation in the time-free driving method, rather than a DC voltage, a common voltage that forms an electric field with the pixel voltage applied to the pixel electrode in each subpixel may be a signal whose voltage level is variable.

Such a common voltage may be referred to as an AC signal, a modulated signal, or a pulse signal.

When the touch display device according to embodiments of the present disclosure performs the driving operation in the time-free driving method, the plurality of touch electrodes TE may be common electrodes which are blocked into several groups and the touch driving signal TDS may be regarded as a common voltage.

Meanwhile, the touch display device according to embodiments of the present disclosure may always perform the driving operation in the time-division driving method, may always perform the driving operation in the time-free driving method, or may perform the driving operation in both the time-division driving method and the time-free driving method.

Figure 6:
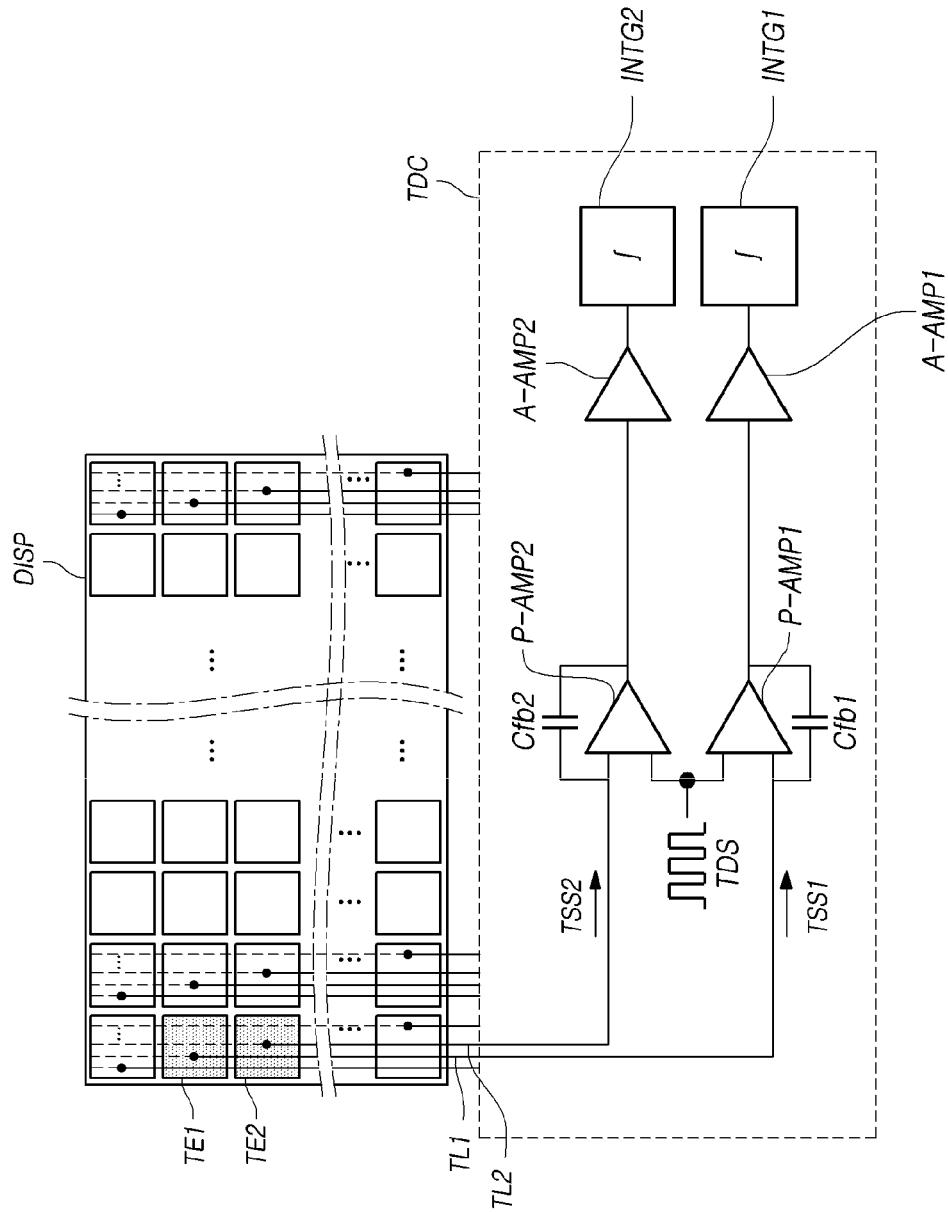
FIG. 6 is a simplified diagram illustrating a touch driving circuit of a single sensing method of a touch display device according to the embodiments of the present disclosure.
Figure 7:
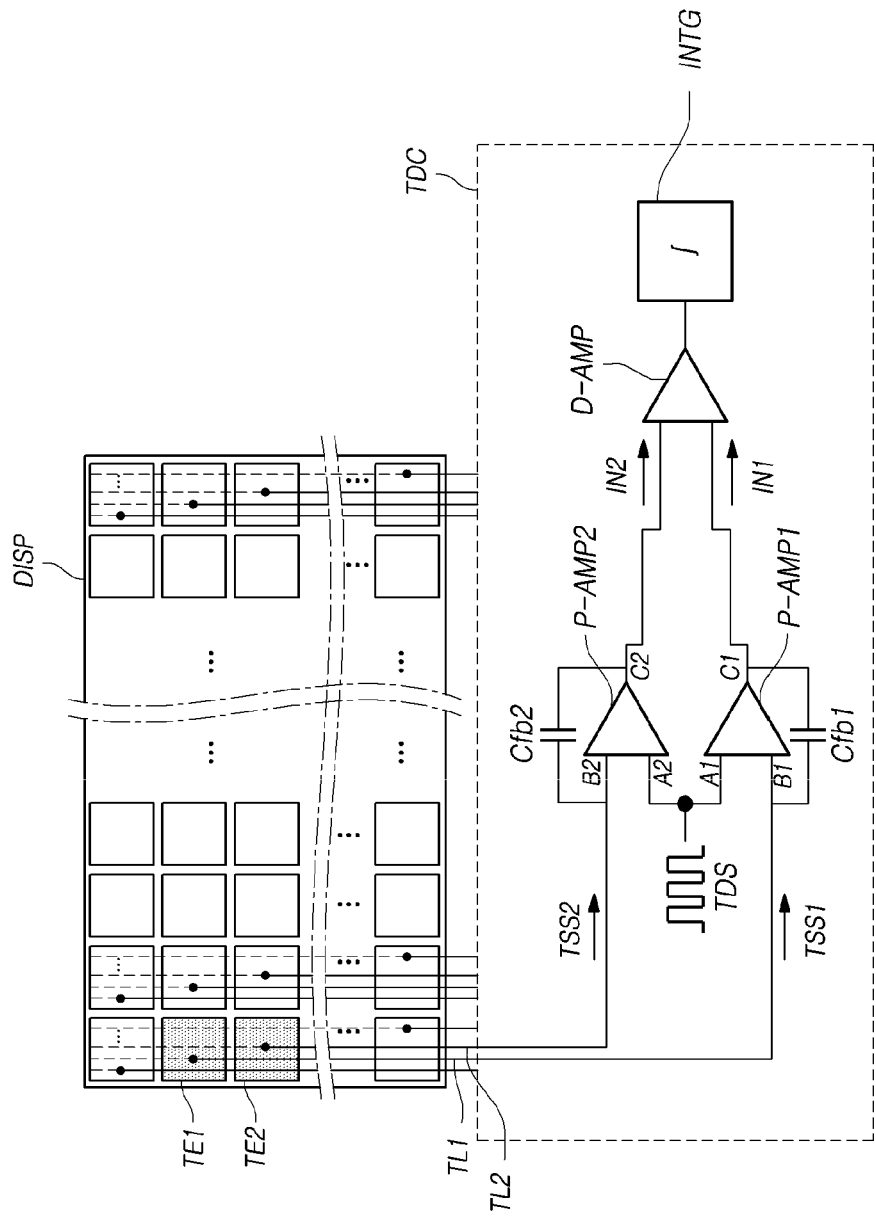
FIGS. 7 to 10 are diagrams illustrating a touch driving circuit of a differential sensing method of a touch display device according to various embodiments of the present disclosure.

FIG. 6 is a simplified diagram illustrating a touch driving circuit TDC of a single sensing method of a touch display device according to the embodiments of the present disclosure.

Referring to FIG. 6, the touch display device according to embodiments of the present disclosure may sequentially or simultaneously drive a plurality of touch electrodes TE, and may separate respective touch electrodes TE from each other for sensing.

In this manner, a method of separating the touch electrodes TE from each other for sensing is referred to as a single sensing method or a single ended method.

A first touch electrode TE1 and a second touch electrode TE2 which commonly overlap one display electrode (e.g., a data line or a gate line) on the display panel DISP may be electrically connected to the touch driving circuit TDC through a first touch line TL1 and a second touch line TL2.

The touch driving circuit TDC may include a sensing unit for the first touch electrode TE1 and a sensing unit for the second touch electrode TE2.

The touch driving circuit TDC may include, as the sensing unit for the first touch electrode TE1, a first preamplifier P-AMP1 for receiving a first sensing signal TSS1 through the first touch line TL1, an amplifier A-APM1 for amplifying a signal output from the first preamplifier P-AMP1, and a first integrator INTG1 for integrating a signal output to the amplifier A-AMP1, and the like.

The touch driving circuit TDC may include, as the sensing unit for the second touch electrode TE2, a second preamplifier P-AMP2 for receiving a second sensing signal TSS2 through the second touch line TL2, an amplifier A-APM2 for amplifying a signal output from the second preamplifier P-AMP2, a second integrator INTG2 for integrating a signal output to the amplifier A-AMP2, and the like.

The first preamplifier P-AMP1 may include a non-inverting input terminal for receiving the touch driving signal TDS, an inverting input terminal for outputting the touch driving signal TDS to the first touch line TL1 and receiving the first sensing signal TSS1 from the first touch line TL1, and an output terminal for outputting the first sensing signal TSS1 and a signal corresponding to the first sensing signal TSS1.

A feedback capacitor Cfb1 may be connected between the inverting input terminal and the output terminal of the first preamplifier P-AMP1.

The second preamplifier P-AMP2 may include a non-inverting input terminal for receiving the touch driving signal TDS, an inverting input terminal for outputting the touch driving signal TDS to the second touch line TL2 and receiving the second sensing signal TSS2 from the second touch line TL2, and an output terminal for outputting the second sensing signal TSS2 or a signal corresponding to the second sensing signal TSS2.

A feedback capacitor Cfb2 may be connected between the inverting input terminal and the output terminal of the second preamplifier P-AMP2.

The sensing unit for the first touch electrode TE1 and the sensing unit for the second touch electrode TE2 may be different from each other.

Alternatively, when the first touch electrode TE1 and the second touch electrode TE2 are sensed at different time zones, the sensing unit for the first touch electrode TE1 and the sensing unit for the second touch electrode TE2 may be the same.

As described above, in the case of the single sensing method, a voltage change of the display electrode by coupling between the display electrode such as the data line DL or the like and the touch electrode TE affects the touch sensing signal TSS. Accordingly, a malfunction of the touch sensing may occur, and the touch sensitivity may be significantly lowered.

As illustrated in FIG. 4, in the case in which the touch display device according to embodiments of the present disclosure performs the driving operation in the time-division method, when the voltage change in the display electrode such as the data line DL or the like does not occur, the touch driving and sensing operations are performed, so that the coupling effect between the display electrode such as the data line DL or the like and the touch electrode TE may be minimized.

However, when the touch display device according to embodiments of the present disclosure performs the driving operation in the time-division driving method, since the time for touch driving and sensing must be separately allocated within one frame time, a display driving time may be short.

In particular, when the touch display device according to embodiments of the present disclosure is applied to a high-resolution display, a satisfactory display driving time at a high resolution may be significantly short, and it is difficult to secure a sufficient pixel charging time when viewed in pixel units.

Therefore, there is an urgent need for a method which may minimize the coupling effect between the display electrode such as the data line DL or the like and the touch electrode TE while performing the driving operation in the time-free driving method to enable a high-resolution display.

Hereinafter, the method which may minimize the coupling effect between the display electrode such as the data line DL or the like and the touch electrode TE while performing the driving operation in the time-free driving method to enable a high-resolution display will be described.

FIGS. 7 to 10 are diagrams illustrating a touch driving circuit of a differential sensing method of a touch display device according to various embodiments of the present disclosure.

A touch display device according to embodiments of the present disclosure may include a display panel DISP with a touch screen panel TSP embedded therein, a touch circuit TC for sensing a touch while an image is displayed through the display panel DISP.

On the display panel DISP with the touch screen panel TSP embedded therein, a plurality of data lines DL and a plurality of gate lines GL are disposed, a plurality of touch electrodes TE are disposed, and a plurality of touch lines TL electrically connected to the plurality of touch electrodes TE while corresponding thereto may be disposed.

The touch circuit TC may drive the touch electrodes TE in a time-free driving method and may sense the touch electrodes TE in a differential sensing method.

That is, the touch circuit TC may acquire the presence/absence of a touch and/or touch coordinates based on sensing data including a value corresponding to a difference between a first sensing signal TSS1 and a second sensing signal TSS2 which are respectively received from a first touch line TL1 and a second touch line TL2 among the plurality of touch lines TL during a display driving period during which data voltages VDATA are applied to the plurality of data lines DL.

As described above, the touch sensing may be performed by removing noise components generated in the two touch electrodes TE1 and TE2 by the display electrode. That is, the touch driving and sensing may eliminate the influence that is caused by the display driving. Thereby, it is possible to normally perform the time-free driving in which the display driving and the touch driving are simultaneously performed. Therefore, a maximum display driving time may be ensured and a sufficient pixel charging time may be ensured, thereby implementing a high-resolution display.

Hereinafter, the touch driving circuit TDC within the touch circuit TC for driving the touch electrodes TE in the time-free driving method and sensing the touch electrodes TE in the differential sensing method will be described in more detail with reference to FIGS. 7 to 10.

FIGS. 7 to 10 are diagrams illustrating a touch driving circuit TDC of a differential sensing method of a touch display device according to embodiments of the present disclosure.

Referring to FIGS. 7 to 10, the touch driving circuit TDC within the touch circuit TC may receive two or more sensing signals TSS1 and TSS2 from two or more touch electrodes TE1 and TE2 corresponding to two or more touch lines TL1 and TL2 among the plurality of touch lines IL.

Referring to FIGS. 7 to 10, the touch driving circuit TDC within the touch circuit TC may include a differential amplifier D-AMP electrically connected to the first touch line TL1 and the second touch line TL2 among the plurality of touch lines TL.

Referring to FIGS. 7 to 10, the differential amplifier D-AMP may output an output signal proportional to a difference between the first sensing signal TSS1 received from the first touch electrode TE1 through the first touch line TL1 and the second sensing signal TSS2 received from the second touch electrode TE2 through the second touch line TL2 among the plurality of touch lines TL, during the display driving period during which the data voltages VDATA are applied to the plurality of data lines DL.

Referring to FIGS. 7 to 10, the touch driving circuit TDC within the touch circuit TC may further include an integrator INTG that integrates and outputs an output signal output from the differential amplifier D-AMP or a signal (e.g., a signal obtained by amplifying the output signal) obtained by signal-processing the output signal.

Here, an integral value output from the integrator INTG may be a value proportional to "TSS1−TSS2" or a value proportional to "TSS2−TSS1".

As described above, the two touch electrodes TE1 and TE2 are differentially sensed to remove the noise components which the two touch electrodes TE1 and TE2 receive from the display electrode (e.g., data line, gate line, or the like), thereby performing touch sensing. That is, the touch driving and sensing may eliminate the influence that is caused by the display driving. Thereby, it is possible to normally perform the time-free driving in which the display driving and the touch driving are simultaneously performed. Therefore, a maximum display driving time may be ensured and a sufficient pixel charging time may be ensured, thereby implementing a high-resolution display.

Referring to FIGS. 7 to 10, the touch driving circuit TDC within the touch circuit TC may supply the touch driving signal TDS to the first touch electrode TE1 and the second touch electrode TE2 during the display driving period, and may receive the first sensing signal TSS1 and the second sensing signal TSS2 from the first touch electrode TE1 and the second touch electrode TE2.

That is, during the display driving period, a touch may be sensed in the differential sensing method based on the self-capacitance.

The touch driving circuit TDC may further include an analog-to-digital converter (not shown) for converting the integral value output by the integrator INTG into a digital sensing value.

The touch driving circuit TDC outputs sensing data including the digital sensing value generated by the analog-to-digital converter.

The touch circuit TC may include a touch driving circuit TDC for outputting sensing data including values corresponding to a difference of sensing signals corresponding to two touch electrodes during the display driving period, and a micro-control unit MCU for sensing the presence/absence of a touch or touch coordinates based on the sensing data output from the touch driving circuit TDC during the display driving period.

As described above, the touch display device according to embodiments of the present disclosure may use the touch driving circuit TDC and the micro-control unit MCU constituting the touch circuit TC to perform touch driving and touch sensing processes during the display driving period.

The touch driving circuit TDC within the touch circuit TC supplies a touch driving signal TDS to the plurality of touch electrodes TE during the display driving period.

At this time, during the display driving period, the touch driving signal TDS supplied to the plurality of touch electrodes TE may be a common voltage applied to the front surface of the display panel DISP.

For example, the touch driving signal TDS may be a common voltage that forms a capacitance with a data voltage VDATA supplied to each of two or more subpixels SP overlapping each touch electrode TE.

That is, during the display driving period, the touch driving signal TDS may be a voltage that forms a capacitance with the data voltage VDATA supplied to each of two or more subpixels SP overlapping the first touch electrode TE1 and a voltage that forms a capacitance with the data voltage VDATA supplied to each of two or more subpixels overlapping the second touch electrode TE2.

During the display driving period, the touch driving signal TDS supplied to the plurality of touch electrodes TE may be a signal whose voltage level changes for touch driving.

When the touch display device according to embodiments of the present disclosure performs the driving operation in the time-free driving method, the plurality of touch electrodes TE are common electrodes, and the touch driving signal TDS is a common voltage, and a common voltage supplied to the common electrode during the display driving period may be regarded as a signal whose voltage level changes.

As described above, the touch driving signal TDS may be used as the common voltage for display driving. Thus, the touch display device according to embodiments of the present disclosure may efficiently drive the display panel DISP with the touch screen panel TSP embedded therein in the time-free driving method.

Referring to FIGS. 7 to 10, the touch driving circuit TDC within the touch circuit TC may further include a first preamplifier P-AMP1 for receiving the first sensing signal TSS1 through the first touch line TL1 among the plurality of touch lines IT and outputting a first input signal IN1 to the differential amplifier D-AMP and a second preamplifier P-AMP2 for receiving the second sensing signal TSS2 through the second touch line TL2 among the plurality of touch lines TL and outputting a second input signal IN2 to the differential amplifier D-AMP.

As described above, by providing the first preamplifier P-AMP1 and the second preamplifier P-AMP2 at a front end of a signal detection configuration (for example, the analog-to-digital converter), it is possible to prevent a deterioration of a signal to noise ratio (SNR) due to signal attenuation and noise, thereby more accurately performing signal detection from each of the first touch electrode TE1 and the second touch electrode TE2.

Referring to FIGS. 7 to 10, the first preamplifier P-AMP1 has a first non-inverting input terminal A1, a first inverting input terminal B1, and a first output terminal C1.

The touch driving signal TDS is input to the first non-inverting input terminal A1 of the first preamplifier P-AMP1.

The first inverting input terminal B1 of the first preamplifier P-AMP1 outputs the touch driving signal TDS to the first touch line TL1 and receives the first sensing signal TSS1 from the first touch line TL1.

The first output terminal C1 of the first preamplifier P-AMP1 outputs the first input signal IN1 to the differential amplifier D-AMP.

The second preamplifier P-AMP2 has a second non-inverting input terminal A2, a second inverting input terminal B2, and a second output terminal C2.

The second non-inverting input terminal A2 of the second preamplifier P-AMP2 receives the touch driving signal TDS.

The second inverting input terminal B2 of the second preamplifier P-AMP2 outputs the touch driving signal TDS to the second touch line TL2 and receives the second sensing signal TSS2 from the second touch line 112.

The second output terminal C2 of the second preamplifier P-AMP2 outputs the second input signal IN2 to the differential amplifier D-AMP.

The first non-inverting input terminal A1 and the second non-inverting input terminal A2 may be electrically connected to each other.

Accordingly, the touch driving signal TDS is simultaneously input to the first non-inverting input terminal A1 of the first preamplifier P-AMP1 and the second non-inverting input terminal A2 of the second preamplifier P-AMP2.

In addition, the touch driving signal TDS is simultaneously output to the first inverting input terminal B1 of the first preamplifier P-AMP1 and the second inverting input terminal B2 of the second preamplifier P-AMP2.

Accordingly, the touch driving signal TDS may be applied to the first touch electrode TE1 through the first touch line TL1 and, at the same time, may be applied to the second touch electrode TE2 through the second touch line TL2.

A first feedback capacitor Cfb1 may be connected between the first inverting input terminal B1 and the first output terminal C1 of the first preamplifier P-AMP1.

A second feedback capacitor Cfb2 may be connected between the second inverting input terminal B2 and the second output terminal C2 of the second preamplifier P-AMP2.

As described above, by using the first preamplifier P-AMP1 and the second preamplifier P-AMP2, it is possible to efficiently perform driving signal supply for touch driving and sensing signal detection for touch sensing in order to sense a touch based on the self-capacitance.

Figure 8:
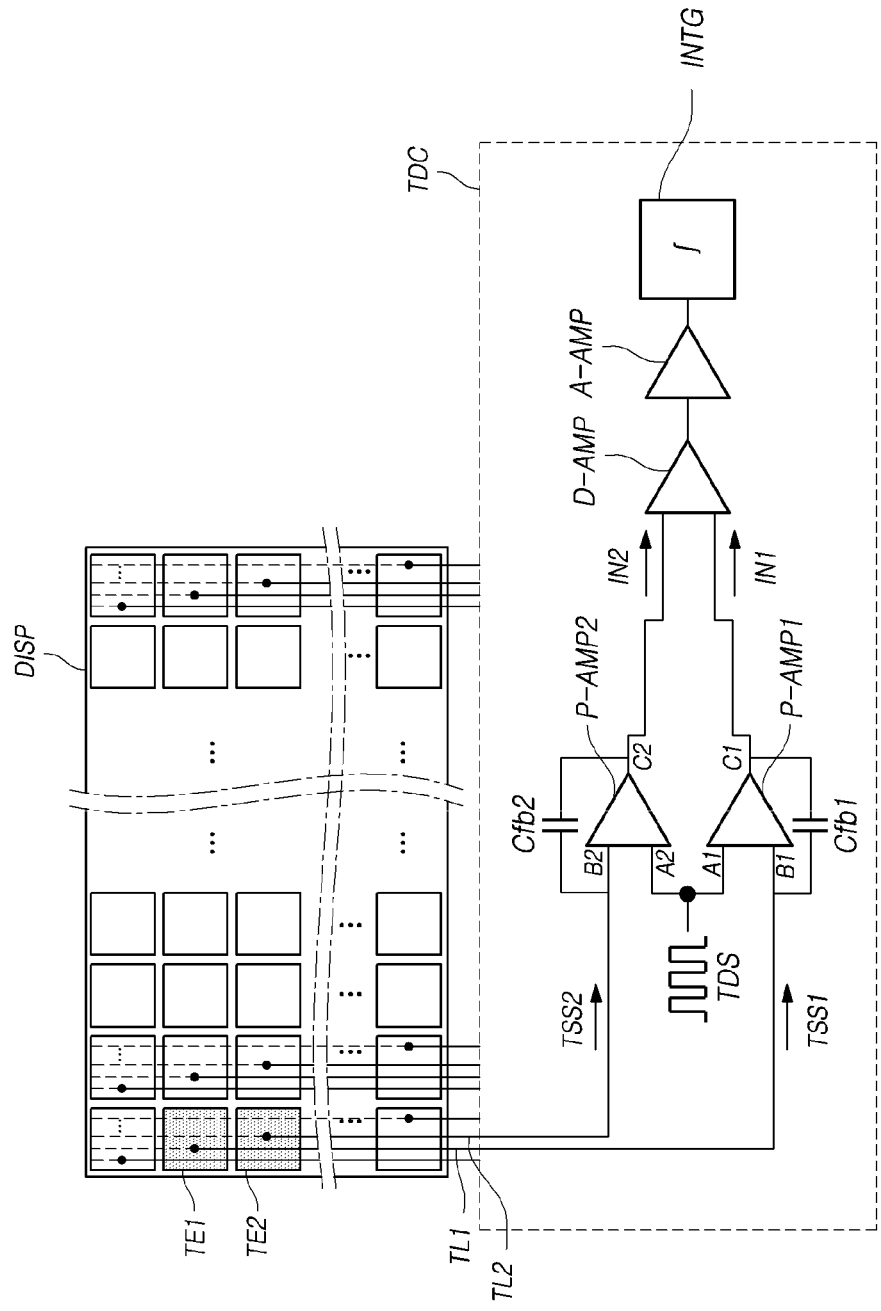

Referring to FIG. 8, the touch driving circuit TDC within the touch circuit TC may further include an amplifier A-AMP connected between the differential amplifier D-AMP and the integrator INTG.

By utilizing this additional amplifier A-AMP, a signal output from the differential amplifier D-AMP may be amplified and subjected to integration processing. Accordingly, a larger (higher) touch sensing value may be obtained, thereby increasing the touch sensitivity.

Figure 9:
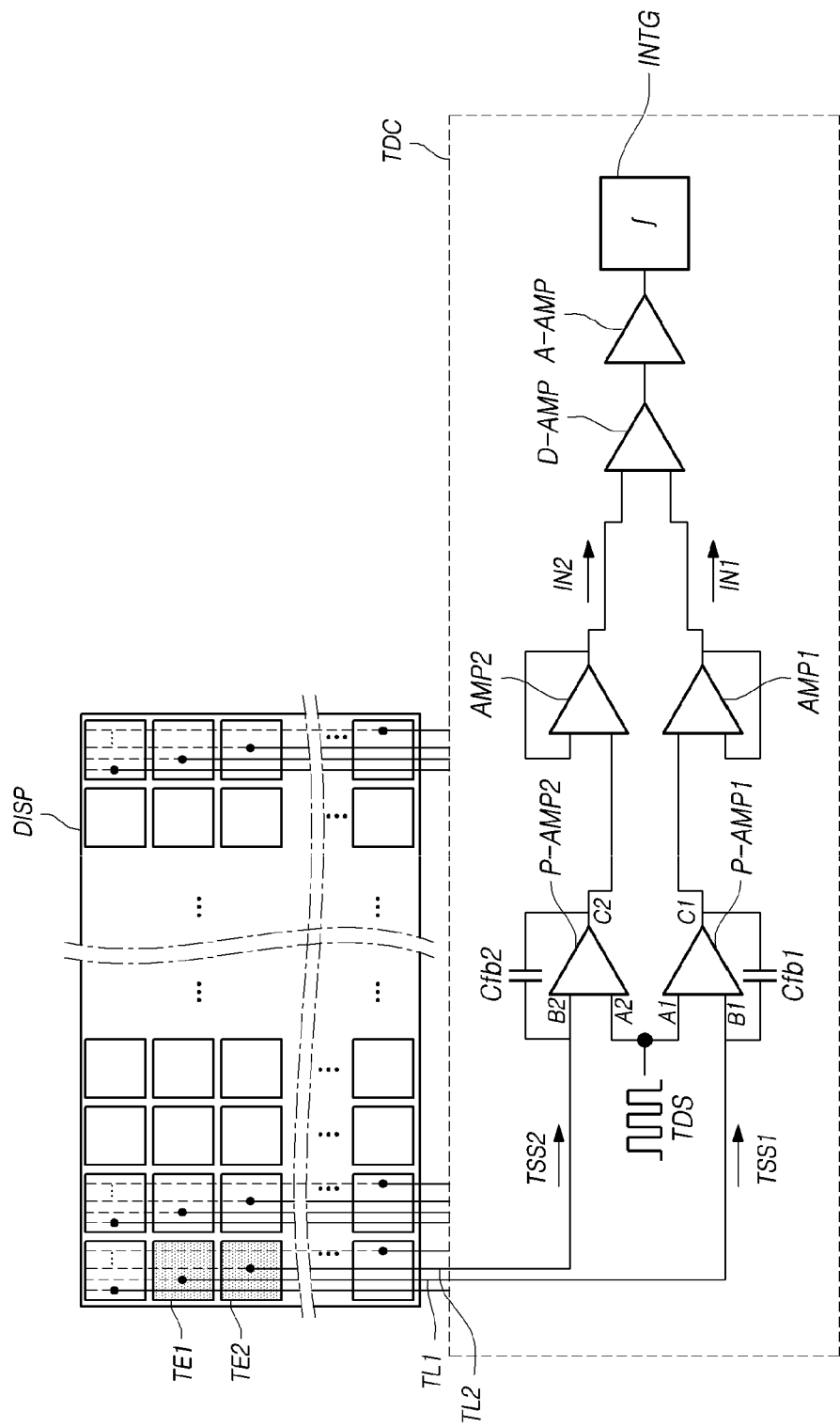

Referring to FIG. 9, the touch driving circuit TDC within the touch circuit TC may further include a first amplifier AMP1 connected between the first preamplifier P-AMP1 and the differential amplifier D-AMP and a second amplifier AMP2 connected between the second preamplifier P-AMP2 and the differential ampler D-AMP.

By further utilizing the first amplifier AMP1 and the second amplifier AMP2, the first input signal IN1 and the second input signal IN2 input to the differential amplifier D-AMP may be amplified. Accordingly, a signal output to the differential amplifier D-AMP may be increased and a larger (higher) touch sensing value may be obtained, thereby increasing the touch sensitivity.

Figure 10:
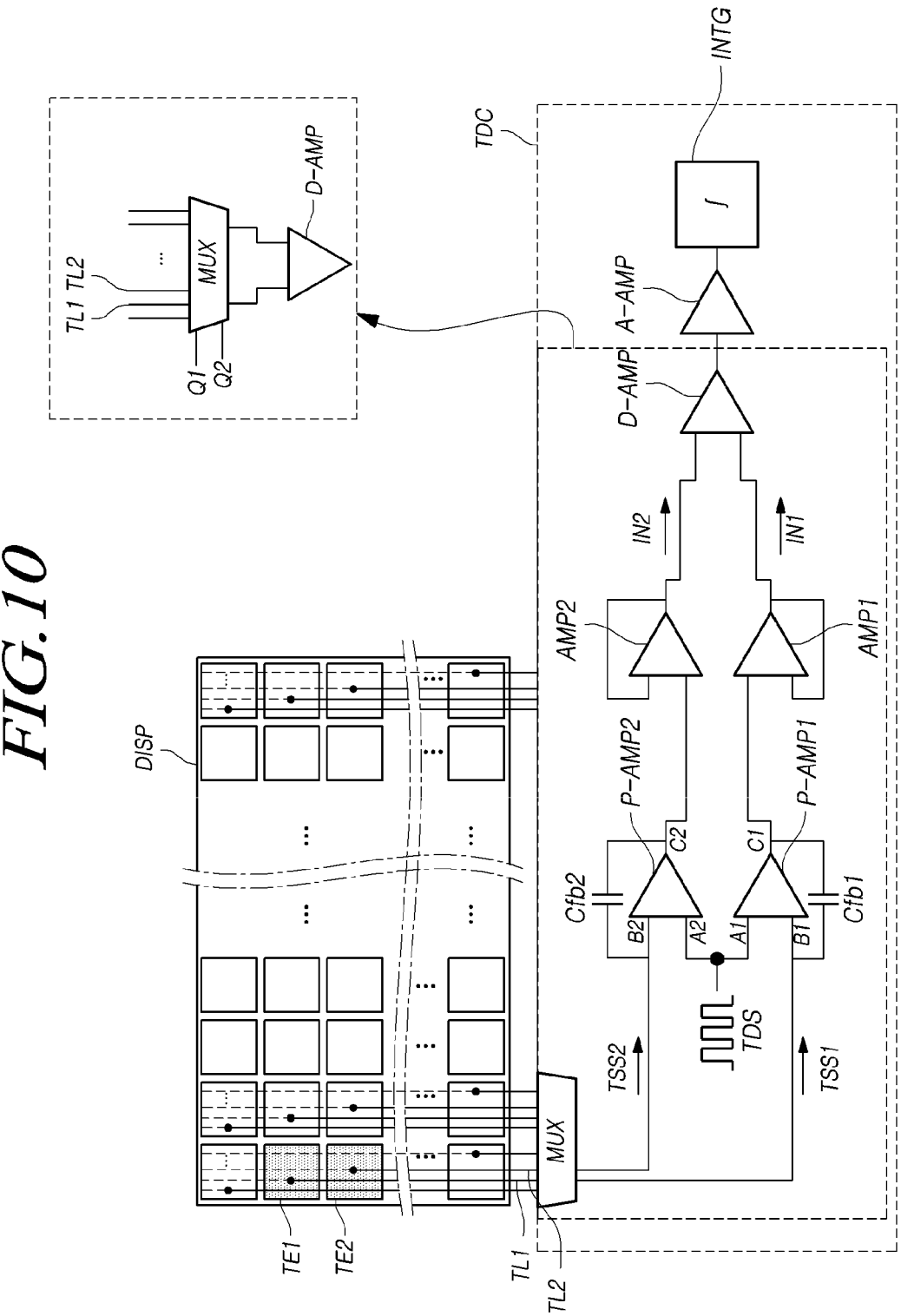

Referring to FIG. 10, the touch driving circuit TDC may further include a multiplexer circuit MUX for selecting the two touch electrodes TE1 and TE2 for differential sensing in accordance with two control signals Q1 and Q2 input from the micro-control unit MCU, the timing controller TCON, an internal controller, or other control devices and connecting the selected touch electrodes TE1 and TE2 to the differential amplifier D-AMP. Here, each of the two control signals Q1 and Q2 may be a control signal corresponding to the two touch electrodes TE1 and TE2 or the two touch lines TL1 and TL2

In FIG. 10, the enlarged portion of the multiplexer circuit MUX is obtained by omitting circuit configurations between the multiplexer circuit MUX and the differential amplifier D-AMP.

Accordingly, by the multiplexer circuit MUX, the first preamplifier P-AMP1 and the second preamplifier P-AMP2 may be electrically connected to the first touch line TL1 and the second touch line TL2 selectively by the two control signals Q1 and Q2 for the purpose of signal detection for differential sensing.

According to the above-described multiplexer circuit MUX, it is possible to sense many touch electrodes TE using only a small number of differential sensing units (first and second preamplifiers, differential amplifier, integrator, and the like). One multiplexer circuit MUX may exist for each one touch electrode row including two or more touch electrodes TE or for each two or more touch electrode rows. That is, the multiplexer circuit MUX can select the touch electrodes TE for comparison to determine the absence or presence of touch. For example, the multiplexer circuit MUX may select adjacent touch electrodes TE1 and TE2 for comparison to determine the absence or presence of touch. Alternatively, the multiplexer circuit MUX may select non-adjacent touch electrodes TE1 and TE3 for comparison to determine the absence or presence of touch.

Hereinafter, the above-described differential sensing method for the two touch electrodes TE1 and TE2 may be further expanded and will described. Assuming that there are eight touch electrodes TE1 to TE8 in one touch electrode row, a differential sensing operation between TE1 and TE2, a differential sensing operation between TE3 and TE4, a differential sensing operation between TE5 and TE6, and a differential sensing operation between TE7 and TE8 may be performed in a first signal detection interval. In a second signal detection interval, a differential sensing operation between TE2 and TE3, a differential sensing operation between TE4 and TE5, and a differential sensing operation between TE6 and TE7 may be performed. As another example of the above-described differential sensing sequence, a differential sensing operation TE1 between TE1 and TE2, a differential sensing operation TE2-TE3 between TE2 and TE3, and a differential sensing operation TE3-TE4 between TE3 and TE4 may be performed sequentially. This differential sensing is also possible in the reverse order. That is, a differential sensing operation TE4-TE3 between TE4 and TE3, a differential sensing operation TE3-TE2 between TE3 and TE2, and a differential sensing operation TE2-TE1 between TE2 and TE1 may be performed.

After performing such a differential sensing operation, the micro-control unit MCU may use differential sensing values (i.e., sensing values obtained from the output signal output from the differential amplifier D-AMP) to calculate a sensing value corresponding to each of the eight touch electrodes TE1 to TE8. For example, through a calculation process of solving simultaneous equations corresponding to the differential sensing values (i.e., sensing values obtained from the output signal output to the differential amplifier D-AMP), the sensing value corresponding to each of the eight touch electrodes TE1 to TE8 may be calculated as a solution of the simultaneous equation.

Figure 11A:
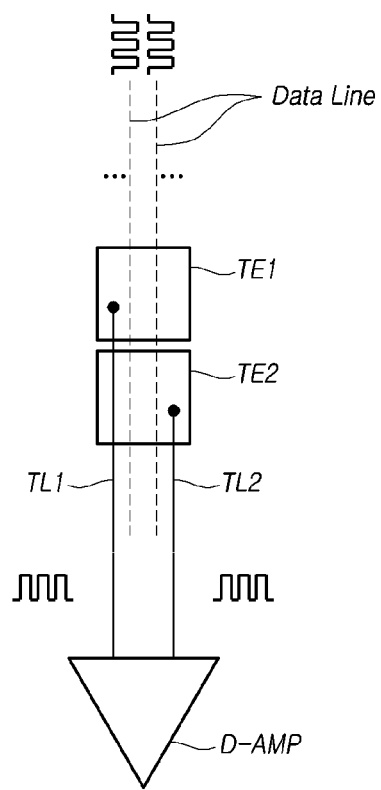
FIGS. 11A and 11B are examples of two touch electrodes differentially sensed in a touch display device according to various embodiments of the present disclosure.
Figure 11B:
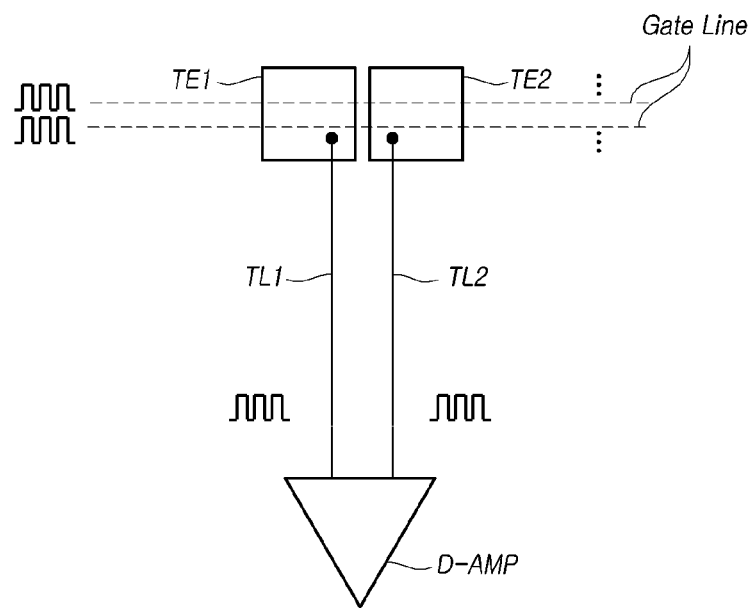

FIGS. 11A and 11B are examples of two touch electrodes TE1 and TE2 differentially sensed in a touch display device according to various embodiments of the present disclosure.

Referring to FIGS. 11A and 11B, a first touch electrode TE1 overlaps two or more data lines DL and two or more gate lines GL, and a second touch electrode TE2 overlaps two or more data lines DL and two or more gate lines GL.

Referring to FIG. 11A, the first touch electrode TE1 and the second touch electrode TE2 to be subjected to differential sensing may overlap the same data line.

In this case, the two or more data lines DL overlapping the first touch electrode TE1 and the two or more data lines DL overlapping the second touch electrode TE2 may be the same. The two or more gate lines GL overlapping the first touch electrode TE1 and the two or more gate lines GL overlapping the second touch electrode TE2 may be different from each other.

In this manner, when the two touch electrodes TE1 and TE2 to be subjected to differential sensing are located in a data line direction, an effect of removing a noise component generated by the data line at the time of touch sensing may be obtained.

As illustrated in FIG. 11A, when the first touch electrode TE1 and the second touch electrode TE2 to be subjected to differential sensing overlap the same data line, the first touch line TL1 electrically connected to the first touch electrode TE1 may overlap the second touch electrode TE2 in different layers, and may be insulated from the second touch electrode TE2 in the display panel DISP.

Alternatively, the second touch line TL2 electrically connected to the second touch electrode TE2 may overlap the first touch electrode TE1 in different layers, and may be insulated from the first touch electrode TE1 in the display panel DISP.

According to this, the touch lines TL need not be disposed in a non-display region. Here, the non-display region is an outer region of the display region where the touch electrodes TE are disposed. Therefore, it is possible to reduce the size of the non-display region, thereby reducing the bezel size of the touch display device.

Meanwhile, referring to FIG. 11A, during the display driving period, a data voltage VDATA supplied to the data line and a touch driving signal TDS supplied to the plurality of touch electrodes TE may be synchronized.

For example, during the display driving period, the voltage level of the touch driving signal TDS supplied to the plurality of touch electrodes TE may rise at a timing a certain time is delayed from a timing when the voltage level of the data voltage VDATA supplied to the data line changes.

Referring to FIG. 11B, the first touch electrode TE1 and the second touch electrode TE2 which are subjected to differential sensing may overlap the same gate line.

In this case, the two or more data lines DL overlapping the first touch electrode TE1 and the two or more data lines DL overlapping the second touch electrode TE2 may be different from each other. The two or more gate lines GL overlapping the first touch electrode TE1 and the two or more gate lines GL overlapping the second touch electrode TE2 may be the same.

In this manner, when the two touch electrodes TE1 and TE2 to be subjected to differential sensing are located in a gate line direction, an effect of removing a noise component generated by the gate line at the time of touch sensing may be obtained.

Meanwhile, when the display driving and the touch driving are simultaneously performed during time-free driving, when the touch driving signal (TDS) of a modulation signal type whose voltage level is variable is applied to the touch electrodes (TE), the data voltage (VDATA) applied to the data lines (DL) may be a signal form (a combination of two signals) obtained by adding a touch driving signal (TDS) to an original voltage for displaying an image. In one example, a data voltage (VDATA) is generated using a gamma voltage in the form of a modulated signal corresponding to the touch drive signal (TDS). Thus, the data voltage (VDATA) applied to the data lines (DL) may have a signal form that swings further by the amplitude of the touch driving signal (TDS) at the original voltage for image display. In this case, the ground voltage applied to the display panel (DISP) may be a DC voltage. In another example, the ground voltage applied to the display panel (DISP) is modulated corresponding to the touch driving signal (TDS). Therefore, the data voltage (VDATA) applied to the data lines (DL) becomes a signal shape that swings further by the amplitude of the ground voltage applied to the display panel (DISP) in the original voltage variation for image display. Here, the amplitude of the ground voltage corresponds to the amplitude of the touch driving signal (TDS).

Likewise, when the display driving and the touch driving are simultaneously performed during time-free driving, when the touch driving signal (TDS) of a modulation signal type whose voltage level is variable is applied to the touch electrodes (TE), the scan signal applied to the gate lines (GL) may be a signal form (a combination of two signals) obtained by adding the touch driving signal (TDS) to an gate voltage for displaying an image. Here, the gate voltage may be a turn-off level gate voltage (ex. VGL) for turning off the gate line, or a turn-on level gate voltage (ex. VGH) for turning on the gate line. In one example, a scan signal is generated using gate voltages (VGH, VGL), which are modulated signal types modulated corresponding to the touch drive signal (TDS). Therefore, the scan signal applied to the gate lines (GL) may have a signal shape that swings further by the amplitude of the touch driving signal (TDS) from the gate voltages (VGH, VGL) for image display. In this case, the ground voltage applied to the display panel (DISP) may be a DC voltage. In another exemplary method, the ground voltage applied to the display panel (DISP) is modulated corresponding to the touch driving signal (TDS). Therefore, the scan signal applied to the gate lines (GL) may have a signal shape that swings further by the amplitude of the ground voltage applied to the display panel (DISP) at the gate voltages (VGH, VGL) for image display. Here, the amplitude of the ground voltage corresponds to the amplitude of the touch driving signal (TDS).

Although some schemes for time-free driving have been described above by way of example, the present invention is not limited thereto and can be implemented in various ways. Hereinafter, a ground voltage modulation method for swinging the ground voltage applied to the display panel (DISP) among the methods for time-free driving will be described in detail.

Figure 12B:
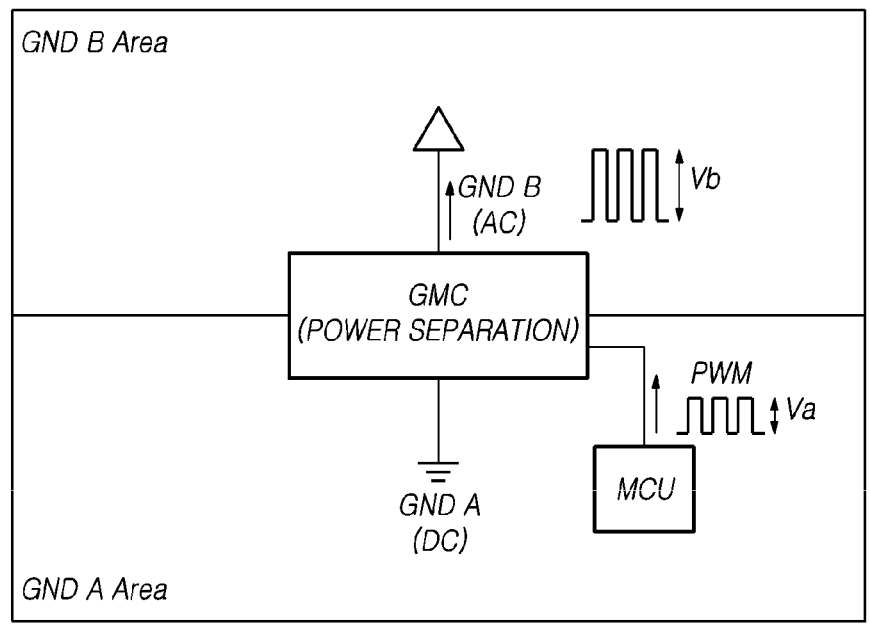

FIGS. 12A and 12B are diagrams illustrating ground voltage modulation for time-free driving in a touch display device according to embodiments of the present disclosure.

Referring to FIGS. 12A and 12B, in the touch display device according to embodiments of the present disclosure, a touch driving signal TDS for time-free driving may be a voltage corresponding to a ground voltage GND_M to which the display panel DISP is grounded.

The ground voltage GND_M in which the display panel DISP is grounded may be a signal whose voltage level changes.

The touch driving signal TDS may correspond to a frequency and a phase of the ground voltage GND_M to which the display panel DISP is grounded.

The ground voltage GND_M to which the display panel DISP is grounded may be a modulated signal based on a ground voltage GND in the form of DC voltage to which a micro-control unit MCU sensing the presence/absence of a touch or touch coordinates or a timing controller TCON for a display driving control is grounded, during the display driving period.

In regard to the above-described ground modulation and touch driving signal TDS, even if a DC voltage-type touch driving signal TDS is applied to the touch electrodes TE corresponding to a common electrode disposed on the display panel DISP in such a manner that the display panel DISP is grounded to the modulated ground voltage M_GND, the touch driving signal TDS is synchronized with the modulated ground voltage M_GND so that the touch driving signal TDS becomes a signal whose voltage level changes to be the same or similar to the modulated ground voltage M_GND.

The above-described ground voltage GND in the form of DC voltage and modulated ground voltage GND_M, and the touch driving signal TDS corresponding to the common voltage will be described once again.

Here, the ground voltage GND in the form of DC voltage may be referred to as a first ground voltage GND A, and the modulated ground voltage GND_M may be referred to as a second ground voltage GND B.

The first ground voltage GND A which is the ground voltage GND in the form of DC voltage is a DC voltage maintaining a constant voltage, but a second ground voltage GND B corresponding to the modulated ground voltage GND_M may be a modulated voltage in terms of the ground voltage GND in the form of DC voltage.

That is, the voltage level of the modulated ground voltage GND_M may be a voltage of a modulated signal which is not maintained at a constant voltage level in terms of the ground voltage GND in the form of DC voltage, but whose voltage level changes over time.

It can be recognized that the touch driving signal TDS corresponding to the common voltage applied to the display panel DISP is also modulated by the modulated ground voltage GND_M.

That is, the touch driving signal TDS corresponding to the common voltage may be recognized as the modulated signal whose voltage level changes over time in terms of the ground voltage GND in the form of DC voltage.

However, the touch driving signal TDS corresponding to the common voltage may be recognized as a DC voltage whose voltage level does not change over time as compared with the modulated ground voltage GND_M.

That is, the touch driving signal TDS corresponding to the common voltage may be a signal whose voltage level changes over time in terms of the ground voltage GND in the form of DC voltage. However, in terms of the modulated ground voltage GND_M, the touch driving signal TDS corresponding to the common voltage may be a signal having a constant voltage level without a change in the voltage level over time.

Meanwhile, the touch display device according to one embodiment of the present disclosure may further include a ground modulation circuit GMC that generates the modulated ground voltage GND_M from the ground voltage GND in the form of DC voltage based on a pulse modulation signal (e.g., a pulse width modulation signal) output from the micro-control unit MCU.

When the second ground voltage GNB B is generated based on a pulse modulation signal (e.g., pulse width modulation signal), the ground modulation circuit GMC of the touch display device according to one embodiment of the present disclosure may generate the second ground voltage GND B in such a manner that the frequency and phase of the second ground voltage GND B are matched with the pulse modulation signal (e.g., pulse width modulation signal).

When the second ground voltage GND B is generated based on a pulse modulation signal PWM, the ground modulation circuit GMC may generate the second ground voltage GND B having a desired amplitude Vb regardless of an amplitude Va of the pulse modulation signal PWM.

The ground modulation circuit GMC of the touch display device according to one embodiment of the present disclosure may include a voltage level changing circuit such as a level shifter.

The ground modulation circuit GMC of the touch display device according to one embodiment of the present disclosure may have a power separation function for separating a first ground voltage GND in the form of DC voltage and a second ground voltage GND_M in the form of AC voltage.

To this end, the ground modulation circuit GMC may include a power separation circuit including one or more of a flyback converter, a flybuck converter, and a transformer.

The touch driving signal TDS applied to the plurality of touch electrodes TE disposed on the display panel DISP may be synchronized with the second ground voltage GND B corresponding to the ground voltage GND_M modulated through the above-described ground modulation. Accordingly, the display driving and the touch driving may be effectively performed at the same time.

Figure 13:
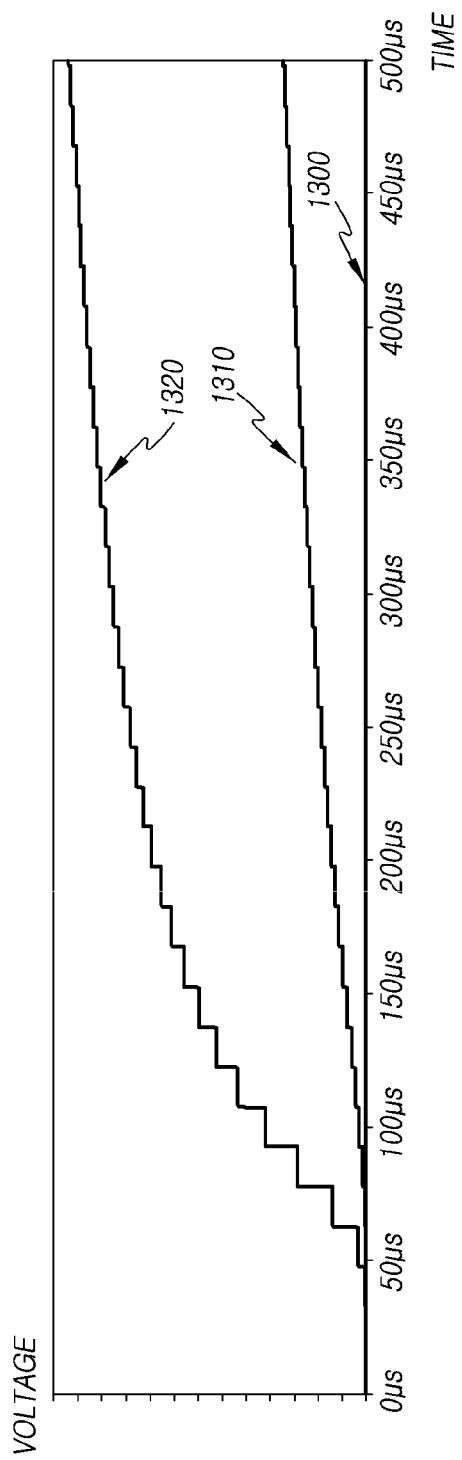
FIG. 13 is a graph illustrating a touch sensing effect according to a differential sensing method of a touch display device according to embodiments of the present disclosure.

FIG. 13 is a graph illustrating a touch sensing effect according to a differential sensing method of a touch display device according to embodiments of the present disclosure.

In the graph illustrated in FIG. 13, an X-axis is time and a Y-axis is a voltage value output from an integrator INTG in a touch driving circuit TDC.

In the graph illustrated in FIG. 13, when a voltage value 1300 output from the integrator INTG is 0 V in the absence of a touch, a voltage value 1310 output from the integrator INTG in accordance with the single sensing method as illustrated in FIG. 6 and a voltage value 1320 output from the integrator INTG in accordance with the differential sensing method as illustrated in FIGS. 7 to 10 are shown when there is a touch.

Referring to FIG. 13, it can be seen that the voltage value 1320 output from the integrator INTG according to the differential sensing method is significantly higher than the voltage value 1310 output from the integrator INTG according to the single sensing method.

Thus, when the touch sensing is performed according to the differential sensing method, the touch sensitivity may be significantly increased because touch sensing is performed using a higher voltage value as compared with the single sensing method.

Figure 14:
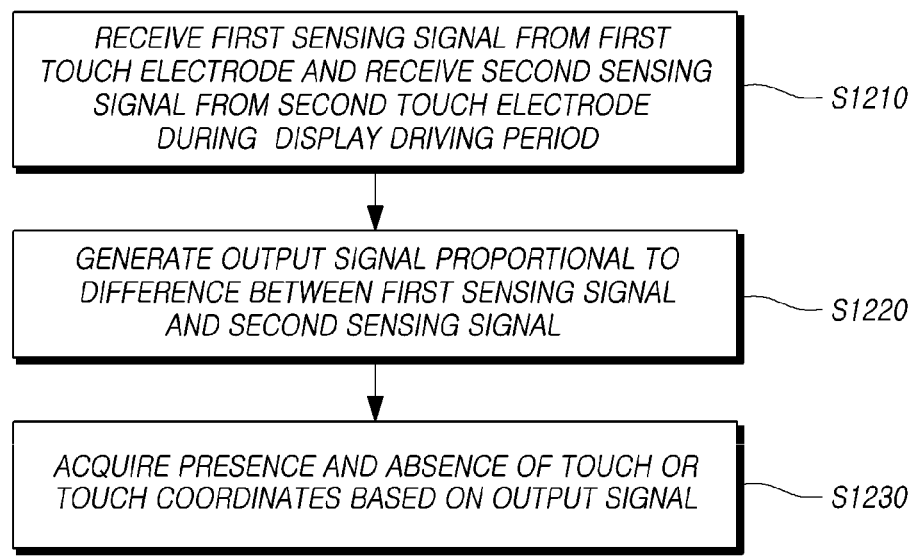
FIG. 14 is a flowchart illustrating a touch sensing method of a touch display device according to embodiments of the present disclosure.

FIG. 14 is a flowchart illustrating a touch sensing method of a touch display device according to embodiments of the present disclosure.

Referring to FIG. 14, a touch sensing method of a touch display device according to embodiments of the present disclosure may include operation S1210 of receiving a first sensing signal TSS1 from a first touch electrode TE1 through a first touch line TL1 among a plurality of touch lines TL during a display driving period in which data voltages VDATA are applied to a plurality of data lines DL and receiving a second sensing signal TSS2 from a second touch electrode TE2 through a second touch line TL2 among the plurality of touch lines TL; operation S1220 of generating an output signal corresponding to a difference between the first sensing signal TSS1 and the second sensing signal TSS2; and operation S1230 of acquiring the presence/absence of a touch or touch coordinates based on the output signal.

When the above-described sensing method is used, noise components which the two touch electrodes TE1 and TE2 receive from the display electrode (e.g., data line, gate line, or the like) may be removed to perform touch sensing by differentially sensing the two touch electrodes TE1 and TE2. That is, the touch driving and sensing may eliminate the influence that is caused by the display driving. Thereby, it is possible to normally perform the time-free driving in which the display driving and the touch driving are simultaneously performed. Therefore, a maximum display driving time may be ensured and a sufficient pixel charging time may be ensured, thereby implementing a high-resolution display.

As described above, the touch display device and the touch circuit TC according to embodiments of the present disclosure basically senses a touch according to a charge sensing method for sensing a change amount of a charge between the two touch electrodes TE, and has a charge sensing structure (e.g., preamplifier having a feedback capacitor).

Meanwhile, the touch display device and the touch circuit TC according to embodiments of the present disclosure may provide a voltage sensing method and a voltage sensing structure which may enable sensing regardless of a change in a charge introduced through a parasitic capacitance, in addition to the above-described charge sensing method and charge sensing structure. Hereinafter, the voltage sensing method and the voltage sensing structure will be described.

Here, the change in the charge introduced through the parasitic capacitance may be caused by a voltage state variation of the data line, which may occur when the display driving and the touch driving are simultaneously performed in the time-free driving method.

Figure 15:
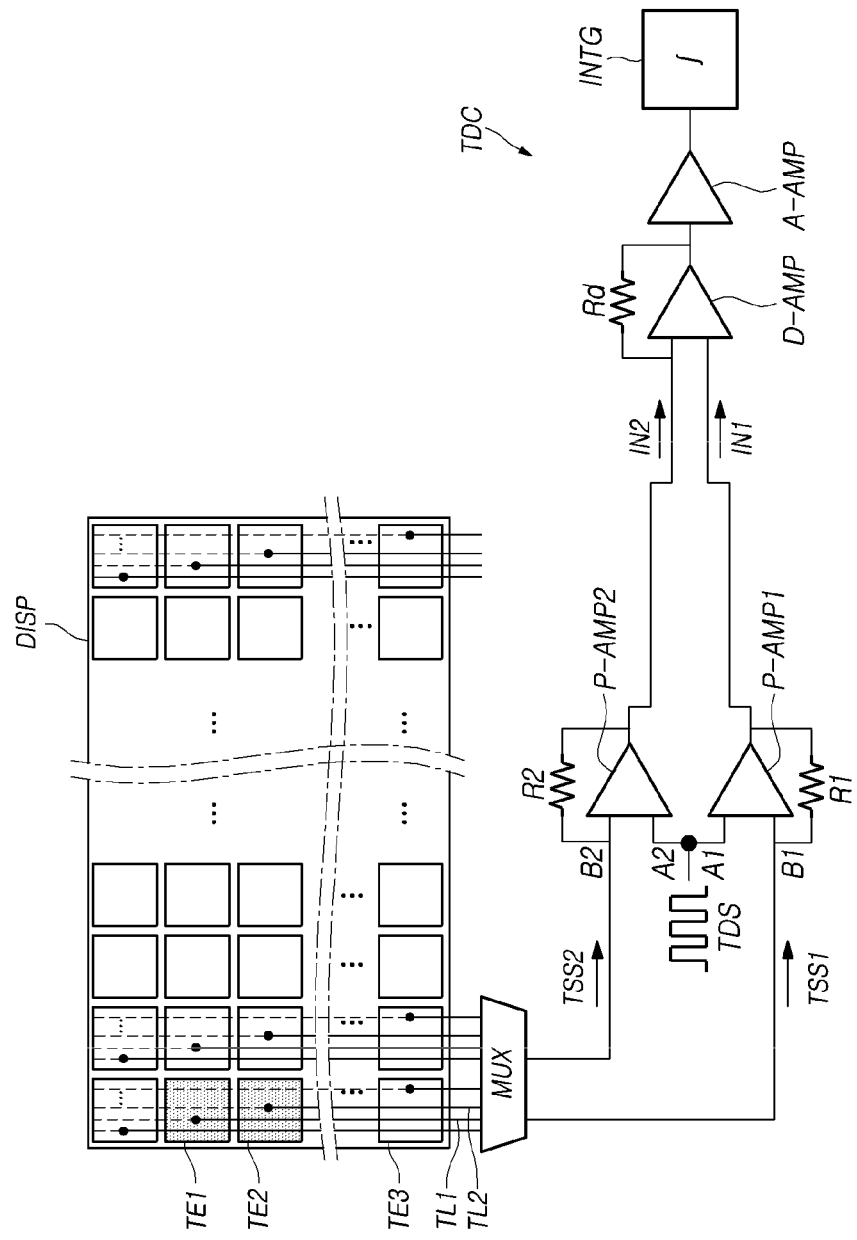
FIG. 15 is another exemplary diagram illustrating a touch driving circuit of a differential sensing method having a voltage sensing structure according to embodiments of the present disclosure.

FIG. 15 is another exemplary diagram illustrating a touch driving circuit TDC of a differential sensing method having a voltage sensing structure according to embodiments of the present disclosure.

Compared with the touch driving circuit TDC of the differential sensing method having the charge sensing structure illustrated in FIGS. 6 to 11A, the touch driving circuit TDC of the differential sensing method having the voltage sensing structure illustrated in FIG. 15 has a difference in that the first and second feedback capacitors Cfb1 and Cfb2 in the first and second preamplifiers P-AMP1 and P-AMP2 are changed to a first resistor R1 and a second resistor R2 and the touch driving circuit TDC of the differential sensing method having the voltage sensing structure has a resistor Rd connected between the input terminal and output terminal of the differential amplifier D-AMP.

More specifically, the touch driving circuit TDC of the differential sensing method illustrated in FIGS. 6 to 11A may have the charge sensing structure. According to this charge sensing structure, the first feedback capacitor Cfb1 may be electrically connected between the first inverting input terminal B1 and first output terminal C1 of the first preamplifier P-AMP1, and the second feedback capacitor Cfb2 may be electrically connected between the second inverting input terminal B2 and second output terminal C2 of the second preamplifier P-AMP2.

The touch driving circuit TDC of the differential sensing method illustrated in FIG. 15 may have the voltage sensing structure. According to this voltage sensing structure, the first resistor R1 may be electrically connected between the first inverting input terminal B1 and first output terminal C1 of the first preamplifier P-AMP1, and the second resistor R2 may be electrically connected between the second inverting input terminal B2 and second output terminal C2 of the second preamplifier P-AMP2.

The first preamplifier P-AMP1 may receive the first sensing signal TSS1 from the display panel DISP, may compare the input first sensing signal TSS1 with the touch driving signal TDS corresponding to a reference voltage, and may amplify the input first sensing signal TSS1 to output a first voltage value to the first output terminal C1.

The second preamplifier P-AMP2 may receive the second sensing signal TSS2 from the display panel DISP, may compare the input second sensing signal TSS2 with the touch driving signal TDS corresponding to a reference voltage, and may amplify the input second sensing signal TSS2 to output a second voltage value to the second output terminal C2.

Referring to FIG. 15, according to the voltage sensing structure, in the differential amplifier D-AMP, the resistor Rd may be electrically connected between the input terminal to which the first voltage value output to the first preamplifier P-AMP1 or the second voltage value output to the second preamplifier P-AMP2 is input and the output terminal to which the output signal is output.

The differential amplifier D-AMP may compare the output signal (first voltage value) of the first preamplifier P-AMP1 and the output signal (second voltage value) of the second preamplifier P-AMP2, and may amplify and output a difference between the two output signals.

Figure 16:
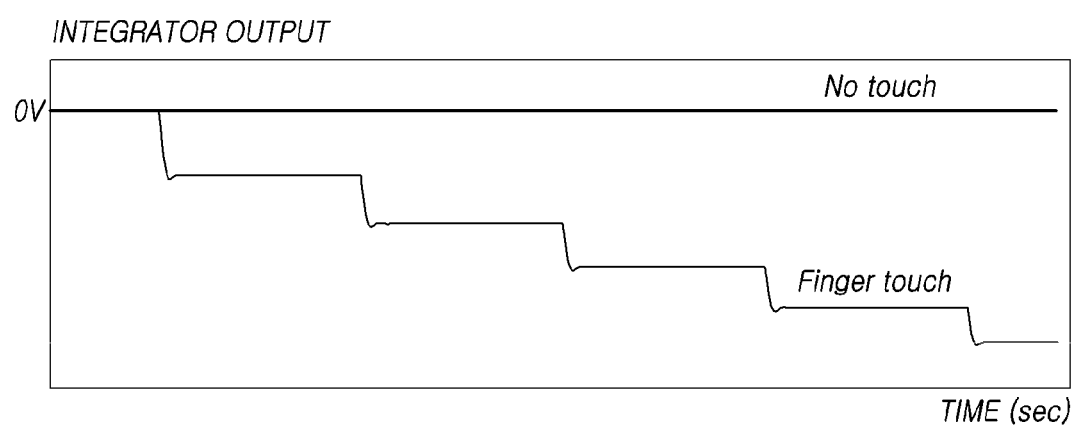
FIG. 16 is a diagram illustrating an output of an integrator in a touch driving circuit of a differential sensing method having a voltage sensing structure according to embodiments of the present disclosure.
Figure 17:
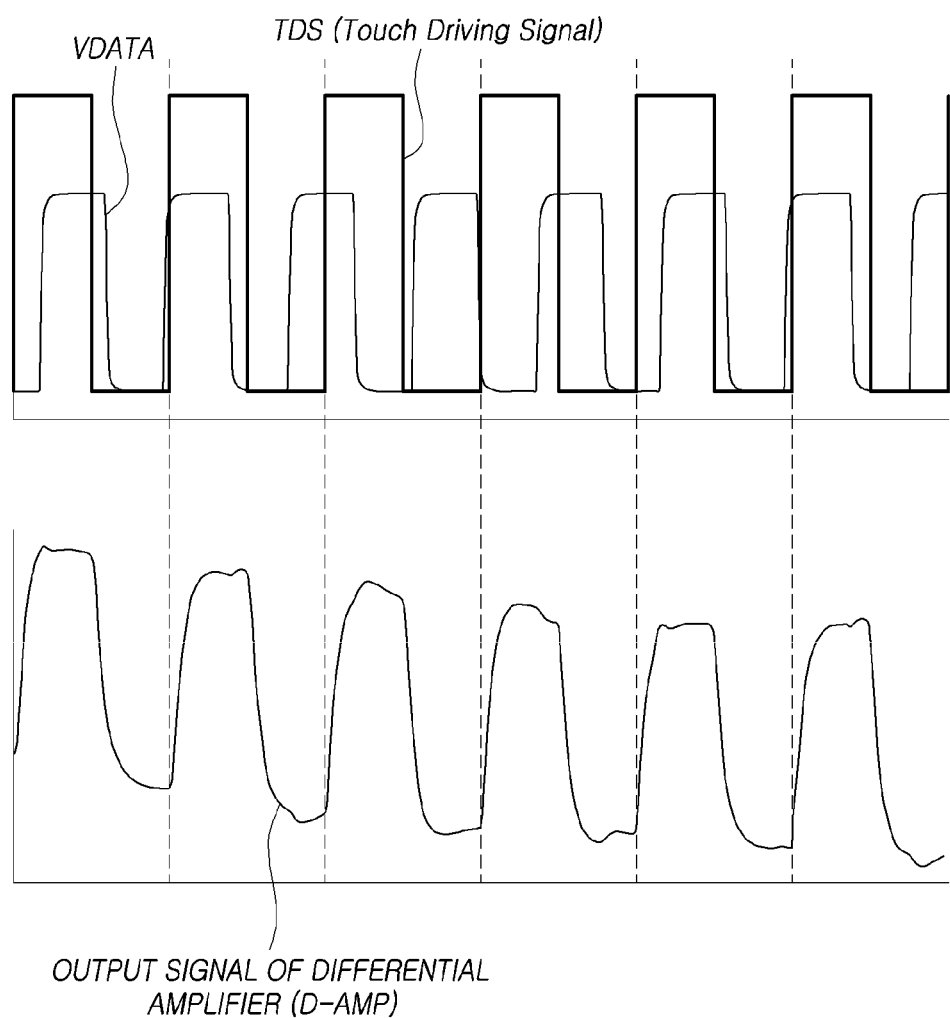
FIG. 17 is a diagram illustrating a data voltage, a touch driving signal, and an output signal of a differential amplifier when using a touch driving circuit of a differential sensing method having a voltage sensing structure according to embodiments of the present disclosure.

FIG. 16 is a diagram illustrating an output of an integrator INTG in a touch driving circuit TDC of a differential sensing method having a voltage sensing structure according to embodiments of the present disclosure, and FIG. 17 is a diagram illustrating a data voltage VDATA, a touch driving signal TDS, and an output signal of a differential amplifier D-AMP when using a touch driving circuit TDC of a differential sensing method having a voltage sensing structure according to embodiments of the present disclosure.

FIG. 16 is a graph illustrating an output of an integrator INTG when there is no touch and when there is a touch by a finger.

As illustrated in the graph of FIG. 16, the output of the integrator INTG when there is a touch by a finger is different from the output of the integrator INTG when there is no touch.

Accordingly, the touch may be normally sensed even through the voltage sensing method.

FIG. 17 is a graph illustrating a data voltage VDATA applied to the data line DL disposed on the display panel DISP, a touch driving signal TDS applied to the touch electrode TE disposed on the display panel DISP, and an output signal of the differential amplifier D-AMP within the touch driving circuit TDC.

As illustrated in FIG. 17, in a case in which the display driving and the touch driving are simultaneously performed in the time-free driving method, even when a change in the data voltage VDATA is generated, the output signal of the differential amplifier D-AMP is minimally affected by the change in the data voltage VDATA. Therefore, accurate touch sensing may be performed.

According to the above-described embodiments of the present disclosure, it is possible to provide a touch display device, a touch circuit, and a touch sensing method which may simultaneously perform display driving and touch driving.

In addition, according to the embodiments of the present disclosure, it is possible to provide a touch display device, a touch circuit, and a touch sensing method which may prevent touch sensitivity from being affected by display driving.

In addition, according to the embodiments of the present disclosure, it is possible to provide a touch display device, a touch circuit, and a touch sensing method which may enable high resolution display implementation.

In addition, according to the embodiments of the present disclosure, it is possible to provide a touch display device, a touch circuit, and a touch sensing method which may perform touch sensing without being influenced by data driving.

In addition, according to the embodiments of the present disclosure, it is possible to provide a touch display device, a touch circuit, and a touch sensing method which may sense a touch while ensuring a maximum display driving time and a sufficient pixel charging time.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:
1. A touch display device comprising:
a display panel comprising a plurality of data lines, a plurality of gate lines, a plurality of touch electrodes, and a plurality of touch lines that are electrically connected to the plurality of touch electrodes; and a touch circuit configured to supply a touch driving signal to the plurality of touch electrodes via the plurality of touch lines during a display driving period of the touch display device at which data voltages are applied to the plurality of data lines for displaying an image, and detect a presence or an absence of a touch of the touch display device based on sensing data including a value corresponding to a difference between a first sensing signal received from a first touch electrode from the plurality of touch electrodes and a second sensing signal received from a second touch electrode from the plurality of touch electrodes responsive to the touch driving signal, wherein the supplying of the touch driving signal to the plurality of touch electrodes and the applying of the data voltages to the plurality of data lines are simultaneously performed in at least one active time in a frame time including one or more active times and one or more blank times.

2. The touch display device of claim 1, wherein the touch circuit comprises:

a differential amplifier configured to output an output signal based on the difference between the first sensing signal received from the first touch electrode via a first touch line from the plurality of touch lines and the second sensing signal received from the second touch electrode via a second touch line from the plurality of touch lines during the display driving period; and an integrator configured to integrate the output signal and output the integrated output signal or a signal-processed integrated output signal.

3. The touch display device of claim 2, wherein the touch circuit further comprises a first preamplifier configured to receive the first sensing signal through the first touch line and to output a first input signal to the differential amplifier; and a second preamplifier configured to receive the second sensing signal through the second touch line and to output a second input signal to the differential amplifier.

4. The touch display device of claim 3, wherein the first preamplifier comprises:

a first non-inverting input terminal that receives a touch driving signal;

a first inverting input terminal configured to output the touch driving signal to the first touch line and to receive the first sensing signal from the first touch line; and a first output terminal configured to output the first input signal to the differential amplifier, and the second preamplifier comprises:

a second non-inverting input terminal that receives the ouch driving signal;

a second inverting input terminal configured to output the touch driving signal to the second touch line and to receive the second sensing signal from the second touch line; and a second output terminal configured to output the second input signal to the differential amplifier.

5. The touch display device of claim 4, further comprising:

a first feedback capacitor electrically connected between the first inverting input terminal of the first preamplifier and the first output terminal of the first preamplifier, and a second feedback capacitor electrically connected between the second inverting input terminal of the second preamplifier and the second output terminal of the second preamplifier.

6. The touch display device of claim 4, further comprising:

a first resistor electrically connected between the first inverting input terminal of the first preamplifier and the first output terminal of the first preamplifier, and a second resistor electrically connected between the second inverting input terminal of the second preamplifier and the second output terminal of the second preamplifier.

7. The touch display device of claim 1, wherein the first touch electrode and the second touch electrode adjacent to each other.

8. The touch display device of claim 1, wherein the first touch electrode and second touch electrode are non-adjacent to each other.

9. The touch display device of claim 1, wherein the touch circuit is configured to detect the absence or presence of touch during the display driving period.

10. The touch display device of claim 1, wherein the first touch electrode overlaps two of the plurality of data lines and overlaps two of the plurality of gate lines, wherein the second touch electrode overlaps the same two data lines as the first touch electrode and overlaps two of the plurality of gate lines that are different from the two gate lines overlapped by the first touch electrode.

11. The touch display device of claim 1, wherein the first touch electrode overlaps two of the plurality of data lines and overlaps two of the plurality of gate lines, wherein the second touch electrode overlaps the same two gate lines as the first touch electrode and overlaps two of the plurality of data lines that are different from the two data lines overlapped by the first touch electrode.

12. The touch display device of claim 1, wherein the plurality of touch lines includes a first touch line and a second touch line, wherein the first touch line overlaps the second touch electrode and is insulated in the display panel, or the second touch line overlaps the first touch electrode and is insulated in the display panel.

13. The touch display device of claim 1, wherein the touch driving signal has a voltage that corresponds to a ground voltage of the display panel, wherein the ground voltage alternates between a plurality of voltage levels at a frequency, and wherein the touch driving signal is in phase with the ground voltage and has a frequency that matches a frequency of the ground voltage.

14. The touch display device of claim 1, wherein the first touch electrode and the second touch electrode are overlapped by a same data line from the plurality of data lines.

15. A touch circuit that senses touch on a display panel that comprises a plurality of data lines, a plurality of gate lines, a plurality of touch electrodes, and a plurality of touch lines that are electrically connected to the plurality of touch electrodes, the touch circuit configured to supply a touch driving signal to the plurality of touch electrodes via the plurality of touch lines during a display driving period of the touch display device at which data voltages are applied to the plurality of data line for displaying an image, the touch circuit comprising:

a differential amplifier configured to output an output signal indicative of a presence or absence of touch of the display panel based on a difference between a first sensing signal received from a first touch electrode of the plurality of touch electrodes through a first touch line from the plurality of touch lines and a second sensing signal received from a second touch electrode of the plurality of touch electrodes through a second touch line of the plurality of touch lines, wherein the supplying of the touch driving signal to the plurality of touch electrodes and the applying of the data voltages to the plurality of data lines are simultaneously performed in at least one active time in a frame time including one or more active times and one or more blank times.

16. The touch circuit of claim 15, wherein the differential amplifier is configured to output the output signal during the display period.

17. The touch circuit of claim 15, further comprising:
a first preamplifier configured to receive the first sensing signal through the first touch line and to output a first input signal to the differential amplifier; and
a second preamplifier configured to receive the second sensing signal through the second touch line and to output a second input signal to the differential amplifier.

18. The touch circuit of claim 17, wherein the first preamplifier comprises:
a first non-inverting input terminal that receives a touch driving signal;
a first inverting input terminal configured to output the touch driving signal to the first touch line and to receive the first sensing signal from the first touch line; and
a first output terminal configured to output the first input signal to the differential amplifier, and
the second preamplifier comprises:
a second non-inverting input terminal that receives the touch driving signal;
a second inverting input terminal configured to output the touch driving signal to the second touch line and to receive the second sensing signal from the second touch line; and
a second output terminal configured to output the second input signal to the differential amplifier.

19. The touch circuit of claim 18, further comprising:
a first feedback capacitor electrically connected between the first inverting input terminal of the first preamplifier and the first output terminal of the first preamplifier, and
a second feedback capacitor electrically connected between the second inverting input terminal of the second preamplifier and the second output terminal of the second preamplifier.

20. The touch circuit of claim 18, further comprising:
a first resistor electrically connected between the first inverting input terminal of the first preamplifier and the first output terminal of the first preamplifier, and
a second resistor electrically connected between the second inverting input terminal of the second preamplifier and the second output terminal of the second preamplifier.

21. The touch circuit of claim 15, further comprising:
a multiplexer circuit configured to select the first touch line and the second touch line from among the plurality of touch lines for differential sensing and to electrically connect the selected first touch line and second touch line to the differential amplifier.

22. The touch circuit of claim 15, wherein the first touch electrode and the second touch electrode are overlapped by a same data line from the plurality of data lines.

23. A touch sensing method of a touch display device comprising a display panel including a plurality of data lines, a plurality of gate lines, a plurality of touch electrodes, and a plurality of touch lines electrically connected to the plurality of touch electrodes, the touch sensing method comprising:
supplying a touch driving signal to the plurality of touch electrodes via the plurality of touch lines during a display driving period of the touch display device at which data voltages are applied to the plurality of data line for displaying an image;
receiving a first sensing signal from a first touch electrode of the plurality of touch electrodes through a first touch line of the plurality of touch lines;
receiving a second sensing signal from a second touch electrode of the plurality of touch electrodes through a second touch line of the plurality of touch lines;
generating an output signal based on a difference between the first sensing signal and the second sensing signal; and
detecting a presence or an absence of touch of the touch display device based on the output signal,
wherein the supplying of the touch driving signal to the plurality of touch electrodes and the applying of the data voltages to the plurality of data lines are simultaneously performed in at least one active time in a frame time including one or more active times and one or more blank times.

24. The touch sensing method of claim 23, wherein the detection of the presence or the absence of touch is during the display driving period.

25. The touch sensing method of claim 23, wherein the first touch electrode and the second touch electrode are overlapped by a same data line from the plurality of data lines.

* * * * *